(12) United States Patent
Kong et al.

(10) Patent No.: US 9,208,919 B2
(45) Date of Patent: Dec. 8, 2015

(54) AEROGELS AND METHODS OF MAKING SAME

(71) Applicants: Jing Kong, Winchester, MA (US); Sung Mi Jung, Malden, MA (US)

(72) Inventors: Jing Kong, Winchester, MA (US); Sung Mi Jung, Malden, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 175 days.

(21) Appl. No.: 13/757,415

(22) Filed: Feb. 1, 2013

(65) Prior Publication Data
US 2013/0202890 A1    Aug. 8, 2013

Related U.S. Application Data

(60) Provisional application No. 61/594,832, filed on Feb. 3, 2012, provisional application No. 61/612,736, filed on Mar. 19, 2012.

(51) Int. Cl.

| | |
|---|---|
| *H01B 1/02* | (2006.01) |
| *H01B 1/04* | (2006.01) |
| *H01B 1/08* | (2006.01) |
| *B01J 20/02* | (2006.01) |
| *B01J 20/10* | (2006.01) |
| *B01J 20/06* | (2006.01) |
| *B01J 20/20* | (2006.01) |
| *H01B 1/14* | (2006.01) |
| *H01B 1/16* | (2006.01) |
| *H01B 1/18* | (2006.01) |
| *B01J 20/28* | (2006.01) |

(52) U.S. Cl.
CPC . *H01B 1/02* (2013.01); *B01J 20/02* (2013.01); *B01J 20/0233* (2013.01); *B01J 20/06* (2013.01); *B01J 20/103* (2013.01); *B01J 20/205* (2013.01); *B01J 20/28007* (2013.01); *B01J 20/28047* (2013.01); *H01B 1/04* (2013.01); *H01B 1/08* (2013.01); *H01B 1/14* (2013.01); *H01B 1/16* (2013.01); *H01B 1/18* (2013.01); *Y10T 428/2982* (2015.01)

(58) Field of Classification Search
CPC .............. H01B 1/02; H01B 1/04; H01B 1/08; H01B 1/14; H01B 1/16; H01B 1/18; B01J 20/02; B01J 20/06; B01J 20/103; B01J 20/205; B01J 20/28007; B01J 20/0233; B01J 20/28047; Y10T 428/2982
USPC .................. 428/402; 252/500, 502, 512, 514, 252/518.1, 520.2; 502/405
See application file for complete search history.

(56) References Cited

U.S. PATENT DOCUMENTS

| | | | |
|---|---|---|---|
| 5,252,215 A | 10/1993 | McFarlane et al. | |
| 2009/0229032 A1* | 9/2009 | Stepanian et al. | ........... 2/69 |

OTHER PUBLICATIONS

Hough et. al., "Viscoelasticity of Single Wall Carbon Nanotube Suspensions" (2004) Phisical Review Letters, vol. 93, No. 16. pp. 168102-1 to 168102-4.*
Aliev, A.E. et al., "Giant-Stroke, Superelastic Carbon Nanotube Aerogel Muscles," Science, vol. 323, 2009, pp. 1575-1578.
Bag, S. et al., "Porous Semiconducting Gels and Aerogels from Chalcogenide Clusters," Science, vol. 317, 2007, pp. 490-493.
Balberg, I. et al., "Excluded volume and its relation to the onset of percolation," Physical Review, vol. 30, No. 7, 1984, pp. 3933-3943.
Balberg, I. et al., "Percolation Thresholds in the Three-Dimensional Sticks System," Physical Letters Review, vol. 52, No. 17, 1984, pp. 1465-1468.
Baumann, T.F. et al., "Synthesis of High-Surface-Area Alumina Aerogels without the Use of Alkoxide Precursors," Chem. Mater. vol. 17, 2005, pp. 395-401.
Bi, H. et al., "Spongy Graphene as a Highly Efficient and Recyclable Sorbent for Oils and Organic Solvents," Adv. Funct. Mater., vol. 22, No. 7, 2012, 5 pp.
Bryning, M.B. et al., "Carbon Nanotube Aerogels," Adv. Mater., vol. 19, 2007, pp. 661-664.
Bug, A.L.R. et al., "Continuum Percolation of Rods," Physical Letters Review, vol. 54, No. 13, 1985, pp. 1412-1415.
Davis, V.A. "Liquid crystalline assembly of nanocylinders," J. Mater. Res., vol. 26, No. 2, 2011, pp. 140-153.
Doi, M. et al., "Dynamics of Rod-like Macromolecules in Concentrated Solution—Part 1," J. Chem. Soc. Faraday Trans. 2, vol. 74, 1978, pp. 560-570.
Doi, M. et al., The Theory of Polymer Dynamics (Oxford University Press, 1986), 2 pp.
Eberle, A.P.R. et al., "Rheology of Non-Newtonian Fluids Containing Glass Fibers: A Review of Experimental Literature," Ind. Eng. Chem. Res., vol. 47, 2008, pp. 3470-3488.
Fagan, J. A. et al., "Length Fractionation of Carbon Nanotubes Using Centrifugation," Advanced Materials, vol. 20, 2008, pp. 1609-1613.
Green, A.A. et al., "Emerging Methods for Producing Monodisperse Graphene Dispersions," J. Phys. Chem. Lett., vol. 1, No. 2, 2010, pp. 544-549.
Gregg, S.J. et al., Adsorption, Surface Area and Porosity (Academic Press, New York, 1982), 2 pp.
Hamann, T. W. et al., "Aerogel Templated NzO Dye-Sensitized Solar Cells," Advanced Materials, vol. 20, 2008, pp. 1560-1564.
Hashim, D.P. et al., "Covalently bonded three-dimensional carbon nonotube solids via boron induced nanojunctions," Scientific Reports, vol. 2, No. 363, 2012, 8 pp.

(Continued)

*Primary Examiner* — Leszek Kiliman
(74) *Attorney, Agent, or Firm* — Foley & Lardner LLP

(57) ABSTRACT

Provided in one embodiment is a method of making an aerogel, comprising: (A) increasing a concentration of a suspension comprising a gel precursor under a condition that promotes formation of a gel, wherein the gel precursor comprises particulates having an asymmetric geometry; and (B) removing a liquid from the gel to form the aerogel, wherein the aerogel and the gel have substantially the same geometry. An aerogel comprising desirable properties are also provided.

12 Claims, 20 Drawing Sheets
(7 of 20 Drawing Sheet(s) Filed in Color)

(56) References Cited

OTHER PUBLICATIONS

Horikawa, T. et al., "Size control and characterization of spherical carbon aerogel particles from resorcinol-formaldehyde resin," Carbon, vol. 42, 2004, pp. 169-175.

Hu, A. et al., "Hydrothermal growth of free standing TiO2 nanowire membranes for photocatalytic degradation of pharmaceuticals," Journal of Hazardous Materials, vol. 189, 2011, pp. 278-282.

Karim, S. et al., "Synthesis of gold nanowires with controlled crystallographic characteristics," Applied Phys. A, vol. 84, 2006, pp. 403-407.

Kim, K.H. et al., "Mechanical and Thermal Management Characteristics of Ultrahigh Surface Area Single-Walled Carbon Nanotube Aerogels," Adv. Func. Mater., vol. 23, No. 3, 2012, 7 pp.

Kim, K.H. et al., "Single-Walled Carbon Nanotube Aerogel-Based Elastic Conductors," Adv. Mater. 2011, vol. 23, pp. 2865-2869.

Kline, T.R. et al., "Template-Grown Metal Wires," Inorganic Chemistry, vol. 45, No. 19, 2006, pp. 7555-7565.

Long, Y. et al., "a-$MnO_2$ nanowires as building blocks for the construction of 3D macro-assemblies," Chem. Commun., vol. 48, 2012, pp. 5925-5927.

Mohanan, J.L. et al., "Porous Semiconductor Chalcogenide Aerogels," Science, vol. 307, 2005, pp. 397-400.

Moner-Girona, M. et al., "Sol-Gel Route to Direct Formation of Silica Aerogel Microparticles Using Supercritical Solvents," Journal of Sol-Gel Science and Technology, vol. 26, Issue 1-3, 2003, pp. 645-649.

Pavasupree, S. et al., "Synthesis of titate, $TiO_2$ (B), and anatase TiO2 nanofibers from natural rutile sand," Journal of Solid State Chemistry, vol. 178, 2005, pp. 3110-3116.

Peigney, A. et al., "Specific surface area of carbon nanotubes and bundles of carbon nanotubes," Carbon, vol. 39, 2001, pp. 507-514.

Smirnova, A. et al., "Novel carbon aerogel-supported catalysts for PEM fuel cell application," International Journal of Hydrogen Energy, vol. 30, 2005, pp. 149-158.

Smith, R.J. et al., "Large-Scale Exfoliation of Inorganic Layered Compounds in Aqueous Surfactant Solutions," Advanced Materials, vol. 23, 2011, pp. 3944-3948.

Wang, X. et al., "Selected-Control Hydrothermal Synthesis of a- and B-MnO2 Single Crystal Nanowires," J. Am. Chem. Soc., vol. 124, No. 12, 2002, pp. 2880-2881.

Wei, T-Y. et al., "A Cost-Effective Supercapacitor Material of Ultrahigh Specific Capacitances: Spinel Nickel Cobaltite Aerogels from an Epoxide-Driven Sol-Gel Process," Advanced Materials, vol. 22, 2010, pp. 347-351.

Worsley, M.A. et al., "Synthesis and Characterization of Monolithic Carbon Aerogel Nanocomposites Containing Double-Walled Carbon Nanotubes," Langmuir, vol. 24, 2008, pp. 9763-9766.

Worsley, M.A. et al., "Synthesis of Graphene Aerogel with High Electrical Conductivity," J. Am. Chem. Soc., vol. 132, 2010, pp. 14067-14069.

Xia, Y. et al., "One-Dimensional Nanostructures: Synthesis, Characterization, and Applications," Adv. Mater. vol. 15, No. 5, 2003, pp. 353-389.

Yao, Q. et al., "Optical sensing of triethylamine using CdSe aerogels," Nanotechnology, vol. 21, 2010, 10 pp.

Yuan, J. et al., "Superwetting nanowire membranes for selective absorption," Nature Nanotechnology, vol. 3, Jun. 2008, pp. 332-336.

Yuan, Z. et al., "Titanium oxide nanotubes, nanofibers and nanowires," Colloids and Surfaces A: Physiochem Engineering Aspects, vol. 241, 2004, pp. 173-183.

Zhao, B. et al., "The evolvement of pits and dislocations on $TiO_2$-β nanowires via oriented attachment growth," Journal of Solid State Chemistry, vol. 182, 2009, pp. 2225-2230.

Zou, J. et al., "Ultralight Multiwalled Carbon Nanotube Aerogel," ACS Nano, vol. 4, No. 12, 2010, pp. 7293-7302.

Hough et al., "Viscoelasticity of single Wall Carbon Nanotube Suspensions" (2004). Physical review letters, vol. 93, No. 16, p. 168102-1 to 168102-4; especially abstract; 168102-1, col. 2, para 1; p. 168102-2, col. 1, para 1; p. 168102-4, col. 1, para 1 to col. 2, para 1.

International Search Report and Written Opinion mailed Jun. 5, 2013 for International Application No. PCT/US2013/024454.

Jung et al., "A facile route for 3D aerogels from nanostructured 1D and 2D materials", (Nov. 2012). Scientific Reports, vol. 2, No. 849, p. 1-6; entire document.

Kumar, "Synthetic Strategies in Chemistry—Chapter 5: Sol-gel Techniques", Natinal Centre for Catalysis Research: Indian Institute of Technology, [online], Apr. 2008 [Retrieved on May 7, 2013].

\* cited by examiner

AEROGELS AND METHODS OF MAKING SAME

RELATED APPLICATIONS

This application claims priority from U.S. Provisional Application Ser. Nos. 61/594,832, filed Feb. 3, 2012, and 61/612,736 filed Mar. 19, 2012, each of which is hereby incorporated by reference in its entirety.

COLOR DRAWINGS

The patent or application file contains at least one drawing executed in color. Copies of this patent or patent application publication with color drawings will be provided by the Office upon request and payment of the necessary fee.

GOVERNMENT SUPPORT

This invention was made with government support under Grant No. DMR0845358, awarded by the National Science Foundation. The government has certain rights in the invention.

BACKGROUND

Aerogels have various applications due to their high surface area and low densities. However, creating various material aerogels has remained a challenge. For example, to date there are only limited types of materials that can be made into "aerogel" structures. These include metal oxide aerogels (e.g., $SiO_2$, $Al_2O_3$), carbon material aerogels (such as carbon, carbon nanotubes (CNTs), graphene), and more recently semiconducting chalcogenide aerogels (e.g., CdS, CdSe, PbTe).

One reason that the type of usable materials to form aerogels is limited is the challenge of forming the starting "gel." Most aerogels are obtained through a sol-gel process with a suitable gelling agent precursor. For example, in the case of $SiO_2$ aerogel, a liquid alcohol (e.g., ethanol) is mixed with a silicon alkoxide precursor, (e.g. tetramethyl orthosilicate (TMOS) or tetraethyl orthosilicate (TEOS)). A hydrolysis reaction forms particles of silicon dioxide, which may form a sol solution. The oxide suspension then undergoes condensation reactions, which result in the creation of metal oxide bridges (M-O-M bridges or M-OH-M bridges) linking the dispersed colloidal particles. When this interlinking has stopped the flow of liquid within the material, a gel is made. Carbon aerogels are made by subjecting gel precursor to supercritical drying and subsequent pyrolysis of an RF aerogel at high temperature. Because this cross-linking reaction is specific only to a selected group of materials, the number of materials that may be used to form aerogels is limited.

SUMMARY

In view of the foregoing, the Inventors have recognized and appreciated the advantages of methods of enabling aerogel fabrication with a wide variety of materials.

Provided in one aspect is a method of making, the method comprising: (A) increasing a concentration of a suspension comprising a gel precursor under a condition that promotes formation of a gel, wherein the gel precursor comprises particulates having an asymmetric geometry; and (B) removing a liquid from the gel to form an aerogel, wherein the aerogel and the gel have substantially the same geometry.

Provided in another aspect is a method of making, comprising: (A) subjecting a suspension comprising a gel precursor comprising particulates to at least one of sonication and filtering; (B) forming the suspension into a gel using hydrothermal synthesis; and (C) removing a liquid from the gel to form an aerogel, wherein at least some of the particulates have an aspect ratio of at least 50.

Provided in another aspect is a composition, comprising: an aerogel, comprising particulates having an aspect ratio of at least 50.

Provided in another aspect is a composition, comprising: an aerogel, comprising particulates having an aspect ratio of at least 50, wherein the aerogel is made according to a method, comprising: (A) increasing a concentration of a suspension comprising a gel precursor under a condition that promotes formation of a gel, wherein the gel precursor comprises the particulates; and (B) removing a liquid from the gel to form the aerogel, wherein the aerogel and the gel have substantially the same geometry.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

DETAILED DESCRIPTION

Figure 1:
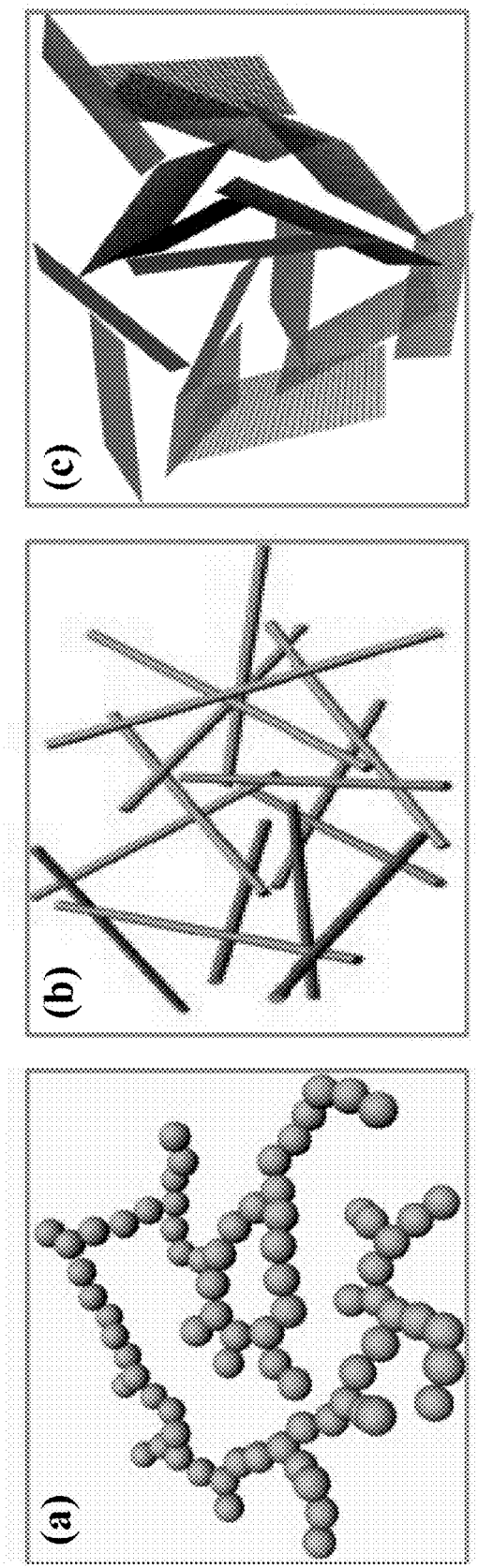
FIGS. 1(a)-1(c) provide a contrast between (a) conventional gel formation and (b)-(c) the gel formation process described in one embodiment: (a) is a schematic of 3-D gel networks of nanoparticles made by conventional processes; (b) and (c) are schematics of gels made by 1-D nanotubes/nanowires and 2-D nanosheets, respectively.

Following are more detailed descriptions of various concepts related to, and embodiments of, inventive aerogels and methods of making same. It should be appreciated that various concepts introduced above and discussed in greater detail below may be implemented in any of numerous ways, as the disclosed concepts are not limited to any particular manner of implementation. Examples of specific implementations and applications are provided primarily for illustrative purposes.

In one aspect, a method of making a composition comprising an aerogel is provided. The method may include first increasing a concentration of a suspension comprising a gel precursor under a condition that promotes formation of a gel. Subsequently, the liquid in the gel may be removed such that an aerogel is formed. In some embodiments provided herein, the gel and the aerogel may have substantially the same geometry.

Gels may contain a solid three-dimensional network that generally spans the volume of a liquid medium and ensnares it through surface tension effects. The bonding between the branches of the 3-D network could be either physical (e.g., van der Waals forces) or chemical (e.g., covalent) bonds. This internal network structure may result from physical bonds or chemical bonds, as well as crystallites or other junctions that remain intact within the extending fluid. For example, hair gels contain mainly positively charged polymers—i.e., cationic polymers. Their positive charges may prevent the formation of coiled polymers. The positive charges allow the polymers to contribute more to viscosity in their stretched state because the stretched-out polymer takes up more space than a coiled polymer, thereby resisting the flow of solvent molecules around the polymer molecule.

When the concentrations of the gel precursor (usually in the form of a suspension in a solvent, such as water) reaches a certain level, the flow of solvent (e.g., liquid water) may be stopped and a gel may form as a result. This level is sometimes referred to as a gel transition point, which is described in further detail below. Therefore, when the concentration of a suspension of long chain molecules, or colloidal particulates of a certain geometry becomes high enough, the probability of these particulates interlinking with one another also becomes high. When this happens, a gel can be made. Once a gel is formed, an aerogel material may be fabricated from the gel by extracting the solvent liquid from the gel.

Gel Precursor

The gel precursor described herein may be any material, depending on the type of aerogel desired. The methods described herein are versatile and may be employed to make any type of aerogel material. For example, the precursor may contain a metal, a compound, a semiconductor, a carbon-containing material, or combinations thereof. One surprising feature of at least one embodiment described herein is that the methods described herein allow gel (and finally aerogel) to be formed with relative low concentration of the precursor material.

The metal may be any metal, including noble metal and transition metal. For example, a noble metal may be gold, silver, platinum, copper, and the like. A transition metal may be may be any element in Groups 3-12 of the Periodic Table. The term "element" herein refers to the elements found on the Periodic Table. For example, a transition metal may be Sc, Y, Ti, Zr, Hf, Rf, V, Nb, Ta, Db, Cr, Mo, W, Sg, M, Tc, Re, Bg, Fe, Ru, Os, Hs, Co, Rh, Ir, Mt, Ni, Pd, Pt, Ds, Cu, Ag, Au, Rg, Zn, Cd, Hg, Cn. In some embodiments, the metal may be silver.

The compound may refer to any compound depending on the applications. For example, the compound may be an oxide, a nitride, a chalcogenide, and the like. An oxide may be a metal oxide (e.g., alumina, titania, iron oxide, zinc oxide, manganese oxide, alkali-metal oxide, alkali-earth metal oxide, or any of the metals described above). The oxide may also be a non-metal oxide, including silica. The compound may also be a metal nitride, metal sulfide, including any of the aforementioned metals as the metal element. For example, the compound may be $MoS_2$, CdS, CdSe, PbTe, or combinations thereof. Alternatively, the nitride and sulfide may be a non-metal nitride and sulfide. For example, the compound may be a boron nitride (e.g., hexagonal boron nitride, or "h-BN").

The semiconductor may be any known semiconductors. The semiconductor may be an elemental semiconductor (only one element) or a compound semiconductor (more than one element). For example, the semiconductor may be silicon. Alternatively, the material may be GaAs, GaN, $MnO_2$, $TiO_2$, ZnO, $Bi_2Te_3$, or combinations thereof.

The carbon-containing material may be any known structure that contains carbon atoms. For example, the material may be graphite, carbon nanotube, carbon nanowire, or graphene. The carbon nanotubes may be single-walled carbon nanotubes, multi-walled carbon nanotubes, or both.

The gel precursor may contain a plurality of particulates. The term "particulates" may have any geometry and need not be spherical. The particulates described herein may have an asymmetric geometry (e.g., anisotropy) such that one dimension thereof is greater than the other; the dimensions described herein may refer to the diameter, length, width, height of the particulate. One feature of at least some embodiments described herein is the formation of aerogels using 1-D and/or 2-D materials using general principle of gel formation based on shape asymmetry. For example, the particulates may be wire-like, tube-like (i.e., wire-like but hollow), sheet-like, flake-like, or any other shape. Because of the nanometer length scale, in some embodiments the particulates may be referred to as nanotubes, nanowires, or nanosheets, depending on the geometry; the particulates may comprise any of the aforedescribed materials.

The asymmetry may be described by, for example, an aspect ratio, which in one embodiment herein may refer to a ratio of the length to the diameter of a particulate (for a tubular/wire like configuration) or to a ratio of the width or length to the thickness of a particulate (for a sheet-like configuration). Accordingly, the particulates may have an aspect ratio of greater than about 1—e.g., greater than about 10, about 50, about 100, about 150, about 200, about 250, about 300, about 350, about 400, about 450, about 500, about 550, about 600, about 650, about 700, about 750, about 800, about 850, about 900, about 950, about 1000, about 2000, about 5000, about 10000, or more. The aspect ratio may be higher (towards infinity) or lower (towards 1.1) than the afore-described values. For example, the aspect ratio may be between about 1 and about 1000—e.g., about 10 and about 500, about 100 and about 400, about 200 and about 300.

The particulates may have any size, ranging from nanometers to microns. The size may refer to an average size in the case of a plurality of particulates. The size may refer to any dimension, including length, width, height, thickness, diameter, etc., depending on the geometry. In some embodiments, the diameter of the particulate described herein may be less than about 500 nm—e.g., less than about 400 nm, about 300 nm, about 200 nm, about 100 nm, about 50 nm, about 20 nm, about 10 nm, about 5 nm, about 1 nm, or less. For example, the diameter may be between about 10 nm and about 500 nm, —e.g., about 20 nm and about 400 nm, about 50 nm and about 300 nm, about 100 nm and about 200 nm. Other dimensions, including the length, of the particulates may be calculated by the aspect ratio described above. For example, the length may be at least about 0.5 microns—e.g., at least about 1 micron, about 2 microns, about 4 microns, about 8 microns, about 16 microns, about 32 microns, or more. In some embodiments, the particulates contain silver and have an average diameter of about 113 nm and an average length of about 13.7 p.m. In some other embodiments, the particulates contain silicon and have an average diameter of about 41 nm and an average length of about 5.2 µm. In some other embodiments, the particulates contain manganese oxide and have an average diameter of about 19 nm and an average length of about 8.4 µm.

The gel precursor may optionally include a surfactant, which may be used to prevent or reduce van der Waals attraction between the particulates, particularly those with a small diameter. In some embodiments, surfactants may be used to prevent aggregation of the particulates. For example, in some embodiments, when the diameters are less than about 100 nm (e.g., less than about 50 nm, about 20 nm, about 10 nm, about 1 nm, or less) at least one surfactant may be used. The surfactant may comprise at least one of sodium dodecylbenzene sulfonate (SDBS), planar sodium cholate, sodium dodecylsulfate (SDS), sodium deoxycholate (SDC), and polyvinylpyrrolidone (PVP). In some other embodiments, no surfactant is needed and the particulates do not aggregate to one another.

The particulates of the aerogels may be made using chemical vapor deposition (CVD), physical vapor deposition (PVD), and or hydrothermal or electrochemical deposition in anodic aluminum oxide (AAO) template. In some embodiments, hydrothermal synthesis may refer to a method of crystallizing a substance from hot water under high pressure. The temperature of the water may be at about 50° C. or more—e.g., about 60° C., about 70° C., about 80° C., about 90° C., or more. The pressure may be at least about 2 atm—e.g., about 3 atm, about 4 atm, about 5 atm, or more. Subsequently, gels may be formed from the method described below. In one embodiment, the nanowires synthesis may involve at least one of hydrothermal synthesis of $MnO_2$ and/or $TiO_2$, CVD synthesis of ZnO and/or GaN, and electrochemical etching/deposition of Si, $Bi_2Te_3$, Ag, Pt, and/or Au nanowires.

Gel Formation

As described above, the gels formed by the methods described herein may be employed to form aerogels. FIG. 1(a) and FIGS. 1(b)-1(c) illustrate the contrast between the gel precursors used respectively in a conventional process and the methods described in one embodiment herein. As one example, one difference between the conventional gel precursor and that described herein is that the nanoparticles network of the conventional system is chemically cross-linked by covalent bonding, whereas the nanowire and nanosheet networks of the presently described precursor are physically bonded by van der Waals forces.

FIG. 1(a) illustrates the gel precursor for a conventional gel formation—e.g., a sol-gel process where nanoparticle suspensions are formed and then a plurality of symmetric (spherical) nanoparticles (0-degree of asymmetry) are interlinked into branches via the metal-oxygen-metal ("M-O-M") bridges. By contrast, as shown in FIG. 1(b), the particulates in the methods and compositions described herein are individually geometrically asymmetric—e.g., nanowires or nanotubes. The wires and nanotubes may be considered as 1-D objects, which may assemble into a higher-order network, such as a 2-D or a 3-D network. The shape asymmetry does not need to be limited to 1-D. As illustrated in FIG. 1(c), the particulates may be 2-D nanosheets, which may also contribute to higher viscosity than a symmetrical (e.g., spherical) object of the same volume.

Figure 13:
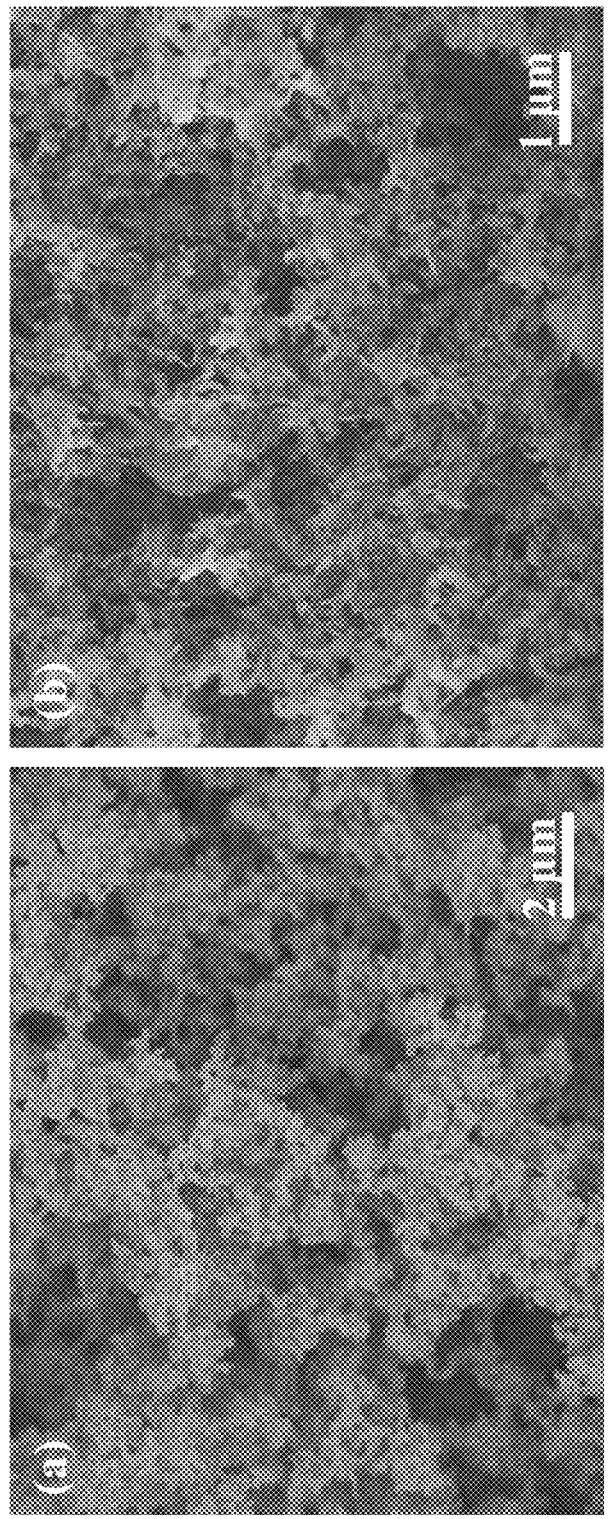
FIGS. 13(a)-13(b) show SEM images of (a) MoS$_2$ and (b) h-BN nanosheet networks in one embodiment.

In some embodiments, $MoS_2$, graphene, and/or h-BN aerogels may be produced from the 2-D sheets materials gels. See FIGS. 13(a)-13(b), showing SEM images of $MoS_2$ and h-BN nanosheet networks, respectively. The 2-D sheets dilute suspensions may be prepared by exfoliation and centrifugation of $MoS_2$, graphite, and h-BN powers, and the dilute suspensions transformed into the 2-D sheets gels at gel transition concentration; and then the gels may be transformed to the $MoS_2$, graphene, and h-BN aerogels after supercritical drying. They may show porous 3-D networks of randomly oriented sheet-like structures.

Figure 2:
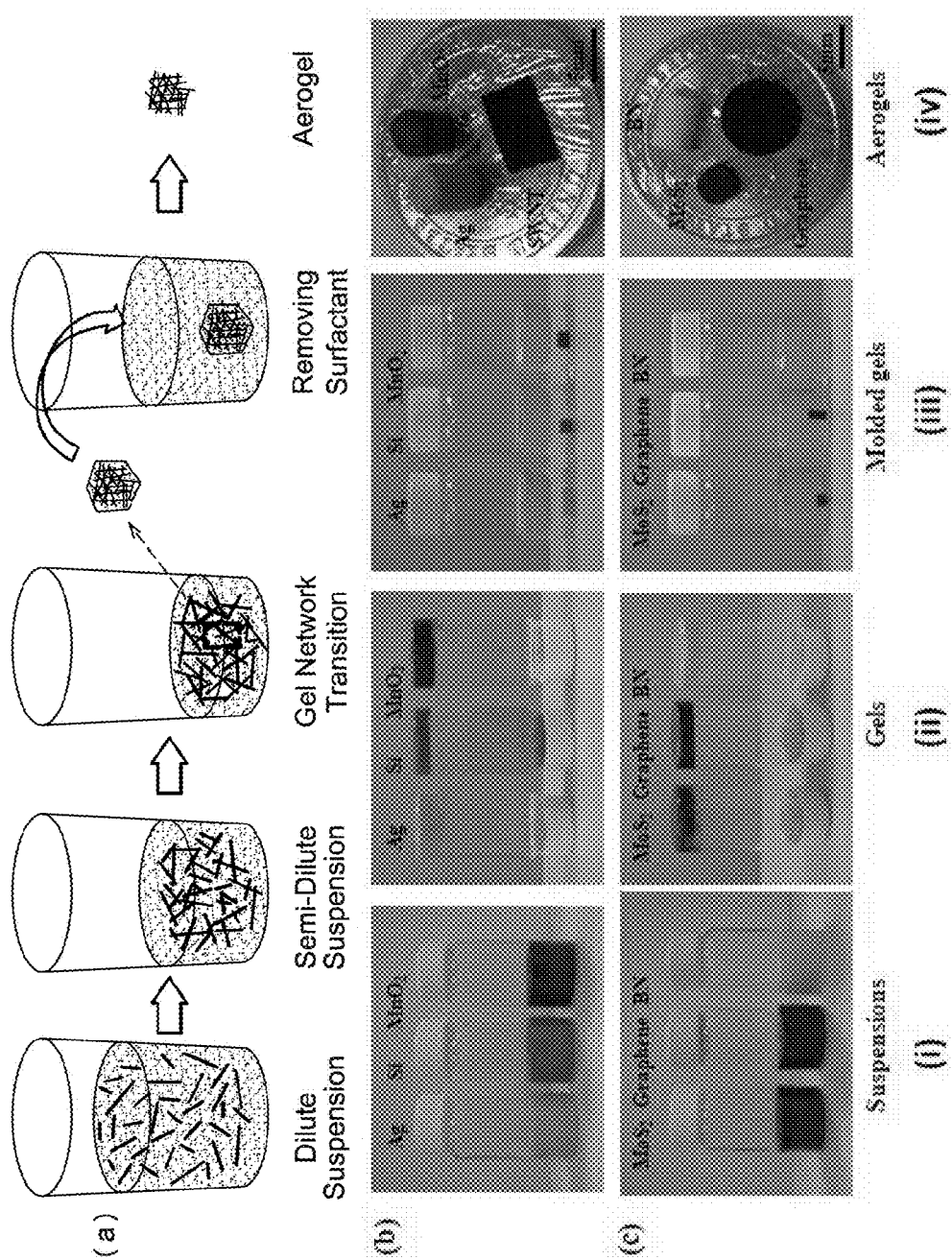
FIGS. 2(a)-(c) provide a series of images showing samples at different stages of the aerogel making process in one embodiment: (a) is a schematic representation of nanowires aerogel production; (b)(i)-(iii) show photographs of suspensions, gels, and molded gels, of Ag, Si, and $MnO_2$ nanowires (for (iv), aerogels of Ag, $MnO_2$, and SWNT are shown) in one embodiment; (c) (i)-(iv) show photographs of suspensions, gels, molded gels, and aerogels, respectively, of $MoS_2$, graphene, and h-boron nitride nanosheet.

The gel formation may be tailored by controlling at least one of the initial concentration of the gel precursor and a reaction time of the synthesis. The synthesis may involve, for example, hydrothermal synthesis. In one embodiment, the gel may be formed by increasing the concentration of the suspension of a gel precursor to above the gel network transition point, which is described below. During this concentrating process, the suspension may undergo different stages, as illustrated in FIGS. 2(a)-2(c), according to one embodiment. The reaction time may be tailored to be of any length of time, depending at least on the materials involved. For example, the reaction time may be at least about 5 minutes—e.g., at least about 10 minutes, about 20 minutes, about 30 minutes, about 60 minutes, about 2 hours, about 4 hours, about 6 hours, about 8 hours, about 10 hours, about 20 hours, about 40 hours, about 50 hours, about 60 hours, about 100 hours, about 120 hours, or longer.

FIG. 2(a) is a schematic representation of the aerogel production with particulates in the form of nanowires and/or nanotubes. Initially, the dilute suspension may contain particulates uniformly dispersed therein (with or without a surfactant, depending on the particulates). See (i) in FIGS. 2(a)-2(c). The dispersion may be achieved by a mechanical force (e.g., by sonication, including ultra-sonication). The suspension may be concentrated by evaporation of the solvent liquid in the suspension. The evaporation may be conducted at a first elevated temperature—e.g., at between about 300 K and about 350 K. For example, the temperature may be about 300 K, about 315 K, or about 325 K. The concentration step may result in a reduction in volume of the suspension by a factor of 2, 3, 4, 5, 6, 7, 8, 9, 10, 20, 50, or more. In some embodiments, the concentration is increased by a factor of 2, 3, 4, 5, 6, 7, 8, 9, 10, 20, 50, or more.

The evaporation may be carried out sufficiently slowly such that the volume of the suspension may be reduced while at least the majority, (e.g., substantially all, or all) of the particulates may remain isolated and not aggregated. The rate of the evaporation may depend on the ambient conditions, the properties of the solvent, and/or the properties of the vessel, etc. The evaporation may be carried out at ambient pressure, such as 1 about atm.

As a result of the increase in the concentration, this concentrated suspension of gel precursor particulates may become a gel containing a 3-D network of the particulates. See (ii) in FIGS. 2(a)-2(c). The resultant gel may be set into various shapes of the molds for subsequent processing. See (iii) in FIGS. 2(a)-2(c). The reduction in distance between the particulates may result in an increase in the van der Waals force between the molecules of the particulates.

In the cases where surfactants are used, the surfactants may be moved from the gel before the gel is transformed into an aerogel. In some embodiments, the molded gels may be soaked in water baths to remove the surfactant. The water in the water temperature may be at a second elevated temperature, which may be the same as or different from the aforementioned first elevated temperature. The water may be at, for example, between about 330 K and about 380 K—e.g., at about 333 K, about 353 K, or about 373 K. The soaking may be carried out for any desirable amount of time (e.g., overnight), depending on the type and the amount of the surfactant used. The soaking may be repeated multiple times with fresh water. Subsequently, the gel may be dried to form an aerogel (See (iv) in FIGS. 2(a)-2(c)), as described below.

In some embodiments, the methods described herein may further include adding chemical coatings (e.g., polymer electrolyte) directly to the gel (skeleton) before the liquids are extracted from the gel to form aerogels.

FIGS. 8(a)-8(e) illustrate devices and the scheme to fabricate these devices provided in some embodiments. In the case of $TiO_2$ nanowire, dye sensitized solar cell ("DSSC") devices may be constructed. The method may start with gel formation using $TiO_2$ nanowire, and the gel may be made into a thin film on a glass slide. By soaking the $TiO_2$ gel into a dye N719 solution, a uniform layer of dye will be coated on the nanowire surface. Since the nanowire network is already formed, the contact region between the nanowires will not be coated, so that the direct contact between the nanowires will be ensured.

Figure 8:
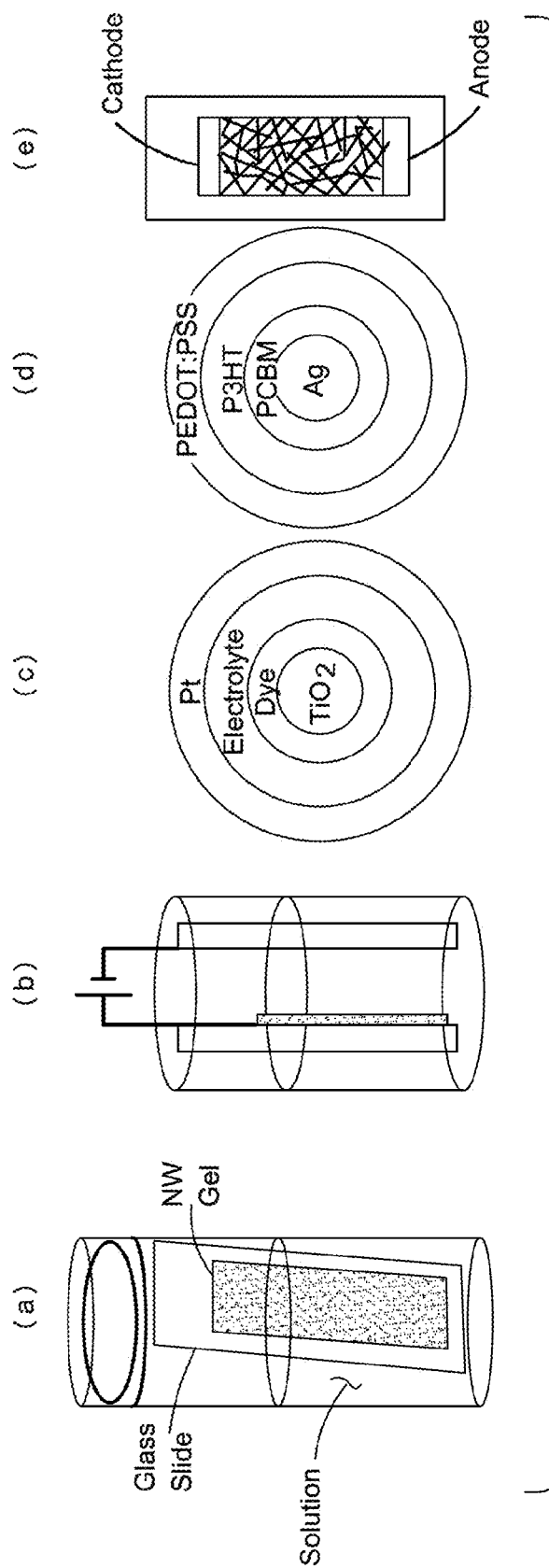
FIGS. 8(a)-8(e) show schematics in one embodiment of: (a) the solution based layer-by-layer deposition process on nanowire gels; (b) the electro-deposition onto the nanowire gels; (c) cross-section of one INSC based on TiO$_2$ nanowire DSSC; (d) cross-section on one INSC of Ag nanowire organic solar cell; and (e) the final INSC devices.

Afterwards, the gel will be soaked into solution of PEO with $KI/I_2$ (the PEO with $KI/I_2$ will be the electrolyte layer for the DSSC (FIG. 8(a), a different solution). Then electrodeposition of a thin layer (5-10 nm) of Pt will be carried out (FIG. 8(b)), so the nanowires will be coated with Pt serving as cathode. Finally CPD is carried out to obtain the coated aerogel. For all these coating steps, only part (e.g., 80%) of the gel is coated, with one side of the gel region having bare $TiO_2$ nanowires; this will be contacted and serve as the anode. Those nanowires having exposed sections in this region will be directly contacted to anode; the rest of the nanowires will be contacted through the nanowire network to the anode. FIG. 8(c) shows the cross-section of the $TiO_2$ DSSC described herein.

Gel Network Transition Point

The gel network transition point referred to herein may be calculated based on the description provided below. As will be shown, the point is a function of several material parameters and thus may depend on the materials involved.

Based on the Doi and Edwards theory, the range of gel transition concentrations may be determined according to one embodiment. Using nanowires as an example of the particulates in one embodiment, the dynamic behavior of the suspensions depends on the concentration and the length of the nanowires. Thus, based on the degree of particle interaction and the excluded volume of a nanowire, the nanowire suspensions can be classified into four concentration regimes: dilute solution, semi-dilute solution, isotropic concentrated solution, and liquid crystalline. Not to be bound by any theory, but in this instance, following this theory, a suspension may be considered to have n nanowires per unit volume, each nanowire with a length L and a diameter d, and a corresponding aspect ratio $a_r = L/d$. The nanowire concentration described through the volume fraction $\varphi$ is defined as $$\varphi = \frac{\pi n L d^2}{4} = \frac{\pi n L^3}{4 a_r^2} \quad (1)$$

Figure 3:
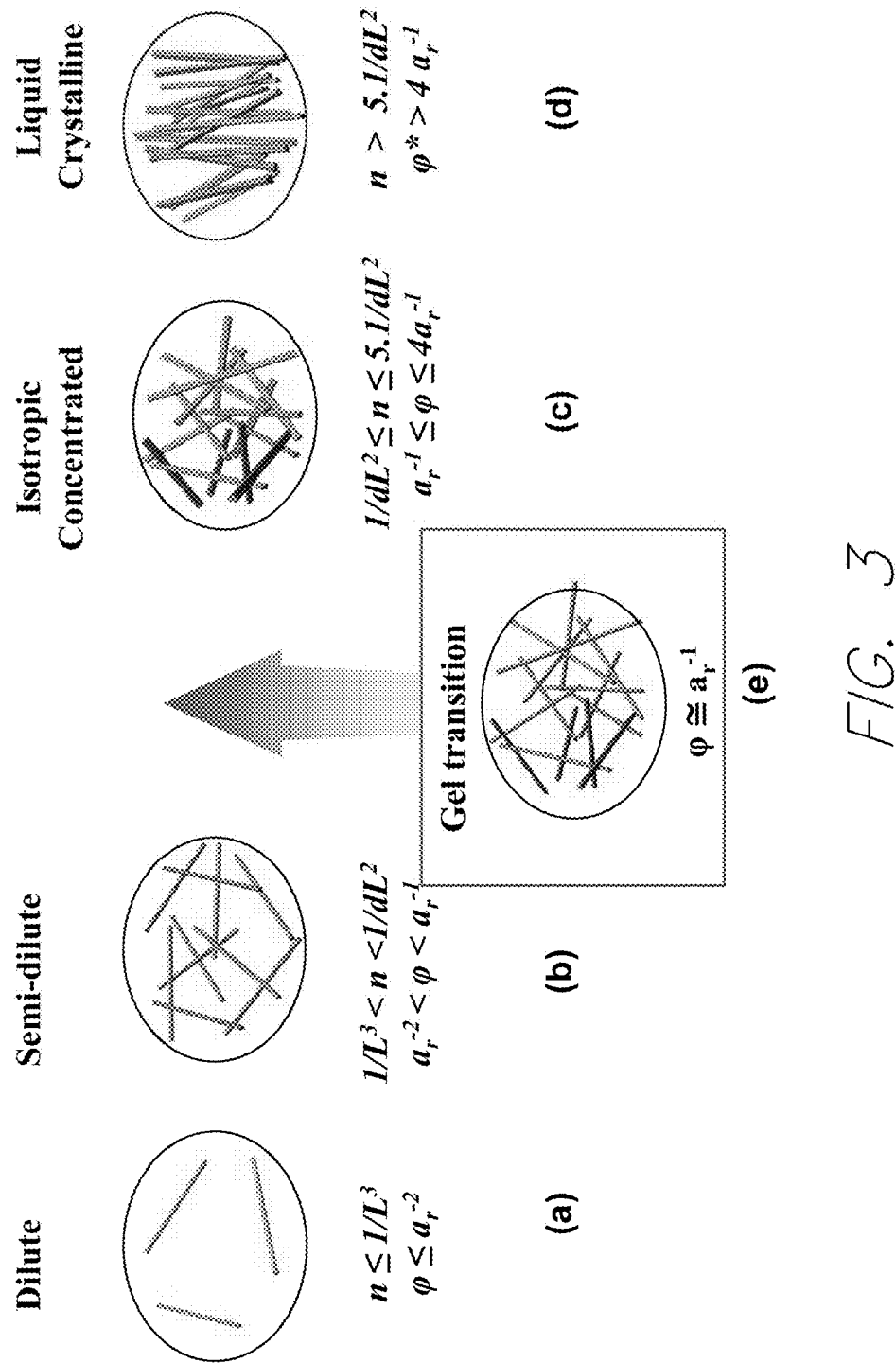
FIGS. 3(a)-3(e) illustrate the volume fraction limits associated with the four concentration regimes, as described in one embodiment.

Thus the volume fraction limits associated with the four concentration regimes can be derived as shown in FIG. 3. The dilute regime (FIG. 3(a)) applies to very low concentrations where a nanowire can move inside the liquid freely without interference with other nanowires. Theoretically, this occurs when the average distance between the nanowires is much larger than L. Therefore, a well-dispersed suspension obeys the constraint $n \leq 1/L^3$ to be considered dilute. This can be related to the nanowire aspect ratio and volume fraction by: $4\phi \leq \pi a_r^{-2}$, which is roughly $\phi \leq a_r^{-2}$. As the nanowire concentration increases, the system becomes semi-dilute where the rotational motion of each nanowire is inhibited by other nanowires and some physical contact interaction between nanowires is present (FIG. 3(b)). The interaction between nanowires is achieved when $n>1/L^3$ and the upper limit is subject to the constraint $n<1/(dL^2)$. Therefore, a randomly oriented, semi-dilute suspension would be subject to the constraints $a_r^{-2} < \phi < a_r^{-1}$. At still higher concentration, an isotropic concentrated regime should be reached where nanowire motion is confined to small volumes, which is $n \geq 1/(dL^2)$ or $\phi \geq a_r^{-1}$. (FIG. 3(c)). Dynamic properties of the nanowires may be affected by nanowire-nanowire interactions and lead to solid-like behavior. Above a critical concentration $\phi^*$, nanowires align in anisotropic phase, and become liquid crystalline (FIG. 3(d)). This critical concentration may be estimated to be $\phi^* > 4 a_r^{-1}$.

The transition point in this embodiment (FIG. 3(e)) refers to the transition from semi-dilute to isotropic concentrated regime. At this transition point, the concentration is $\phi \cong a_r^{-1}$ which forms a 3-D continuous nanowire network due to physical bonds formation between the nanowires at overlapping contacts. Accordingly, it may be predicted that gel forms near at semi-dilute to isotropic concentrated transition and defined the theoretical gel transition concentration as $\phi_{gel} \cong a_r^{-1}$.

Aerogel Formation

The gel formed according to the methods described above may be further dried to remove the liquid (solvent) from the gel to form an aerogel. Drying may be carried out by any suitable drying techniques, depending on the materials involved. The techniques may include (i) freeze drying, (ii) supercritical point drying ("CPD"), or both.

In one alternative embodiment, the aerogel may be formed by a method of making, wherein the method comprises: (A) subjecting a suspension comprising a gel precursor comprising particulates to at least one of ultrasonication and filtering; (B) forming the suspension into a gel using hydrothermal synthesis; and (C) removing a liquid from the gel to form an aerogel. The precursor and gel may be any of those aforedescribed.

In a CPD process in one embodiment, the liquid may be dried off slowly without causing the solid matrix in the gel to collapse from capillary action, as would happen with conventional evaporation techniques. As a result, the 3-D structure of the particulates in the gel may be preserved in the aerogel upon the transition from gel into an aerogel. For example, the aerogel may contain 3-D network of crystalline nanowires, nanosheets, nanotubes, or combinations thereof. In some embodiments, the level of preservation may account for minute discrepancies, so long as at least the majority (e.g., substantially all, or even all) of the network structure is preserved. In some embodiments, because of this preservation, the geometry of the gel may also be preserved upon the transition into the aerogel. The geometry in some embodiments herein may refer to shape, size (e.g., volume), and the like.

Because the nanowires may be synthesized by a hydrothermal method, the gel formation may take place during the hydrothermal synthesis when the nanowires are crystallizing out from the hot water under high pressure. In one embodiment, the method may include forming the gel from the gel precursor by hydrothermal synthesis. The diameter and the length of the nanowires may depend on the pH and concentration of the solution, the temperature, and the reaction time. In one embodiment, by fixing the reaction conditions but changing the reaction time, nanowire gels of different densities (and porosities) may be obtained. See FIGS. 12(a)-12(b).

The aerogels produced according to the methods described in some embodiments herein may have desirable properties, including high surface areas and high thermal resistivity. The aerogel may be hydrophobic or hydrophilic. In one embodiment, a portion of the aerogel is hydrophilic and another portion thereof is hydrophobic. The aerogel may be elastic; in some embodiments, the aerogel exhibits superelasticity. The aerogels described herein may have a much higher electrical conductivity than an aerogel produced by a conventional technique. For example, the presently described aerogels may have an electrical conductivity that is larger than a conventional aerogel by a factor of at least about 2, about 3, about 4, about 6, about 8, about 10, or more. In some embodiments, the aerogel may have an electrical conductivity that is at least about 200 S/m—e.g., at least about 300, about 400 S/m, about 600 S/m, about 800 S/m; about 1,000 S/m; about $0.5 \times 10^4$ S/m; about $1 \times 10^4$ S/m; about $0.5 \times 10^5$ S/m; about $1 \times 10^5$ S/m; about $0.5 \times 10^6$ S/m; about $1 \times 10^6$ S/m; about $0.5 \times 10^7$ S/m; about $1 \times 10^7$ S/m, or more. In one embodiment, the aerogel has an electrical conductivity of at least $3 \times 10^6$ S/m.

Figure 4:
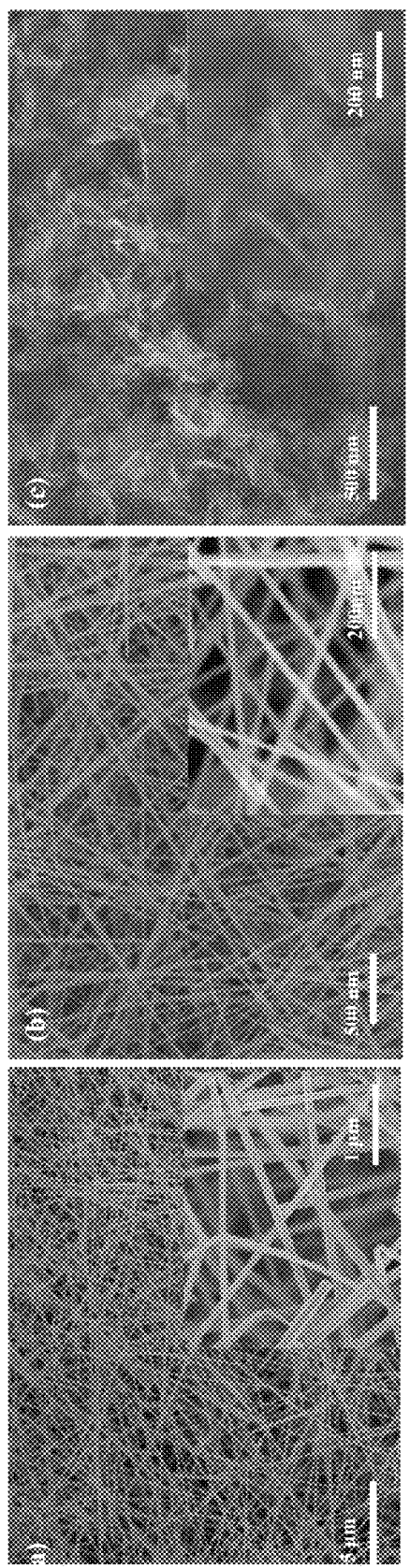
FIGS. 4(a)-(c) show SEM images of (a) Ag nanowires, (b) MnO$_2$ nanowires, and (c) graphene nano-sheet networks in the aerogels described in one embodiment; the insets show respective higher magnification images of the aerogels.

The aerogels produced according to the methods described in some embodiments herein may have a mesoporous microstructure, having high porosity and/or high surface area (i.e., low density). As shown in FIGS. 4(a)-(c), the mesoporous microstructure may be an interconnected mesoporous microstructure. The pores may have any geometries. In some embodiments, the pores may be cylindrical, slit-shaped, or any other shape, or a combination of any of these. For example, the aerogels may have pore sizes ranging from about 1 nm to about 10 cm—e.g., about 10 nm to about 1000 microns, about 100 nm to about 100 microns, about 1 micron to about 10 microns. The aerogel may have a surface area of at least about 5 m$^2$/g—e.g., at least 10 m$^2$/g, about 20 m$^2$/g, about 50 m$^2$/g, about 70 m$^2$/g, about 80 m$^2$/g, about 90 m$^2$/g, about 100 m$^2$/g, about 150 m$^2$/g, about 200 m$^2$/g, about 300 m$^2$/g, about 400 m$^2$/g, about 600 m$^2$/g, about 1000 m$^2$/g, about 1200 m$^2$/g, or more. In one embodiment, the aerogel has a surface area of at least about 5.5 m$^2$/g. Alternatively (and/or additionally), the aerogels may have a density that is lower than or equal to about 200 mg/cm$^3$—e.g., lower than or equal to about 150 mg/cm$^3$, about 120 mg/cm$^3$, about 100 mg/cm$^3$, about 80 mg/cm$^3$, about 60 mg/cm$^3$, about 40 mg/cm$^3$, about 20 mg/cm$^3$, about 10 mg/cm$^3$, about 5 mg/cm$^3$, about 4 mg/cm$^3$, about 3 mg/cm$^3$, or less.

In one embodiment, the aerogel provided herein may be highly absorbent of a fluid. The fluid may be, or include, a solvent—e.g., an oil. The oil may be any type of oil, including motor oil. The fluid may also be, or include, or types of solvents, including organic solvents. Examples of the organic solvents include toluene, hexane, chloroform, ethylene glycol, 1,2-dicholorobenzene, etc. The solvent may be, or include, a dye—e.g., an organic dye. Examples of an organic dye include methylene blue (MB), methyl organge (MO), methyl violet etc. In one embodiment, the aerogel may have a high weight-to-weight absorption capacity (W). "W" in one embodiment is defined as the ratio of the final weight after absorption to the initial weight before absorption. In one embodiment, the W of the aerogels described herein may be at least about 100—e.g., at least about 150, about 200, about 250, about 300, about 350, about 400, about 450, about 500, about 550, about 600, or higher.

As described above, the properties of the aerogels may depend on the materials involved. For example, when the particulates contain silver, the aerogel may have (i) an electrical conductivity of at least about $3 \times 10^6$ S/m, (ii) a density of less than or equal to about 90 mg/cm$^3$, or both. Alternatively, when the particulates contain single-wall carbon nanotubes, the aerogels may have (i) an electrical conductivity of at least about 300 S/m, (ii) a density of less than or equal to about 2.7 mg/cm$^3$, or both. Alternatively, when the particulates contain graphene, the aerogel may have (i) an electrical conductivity of at least about 400 S/m, (ii) a density of less than or equal to about 15 mg/cm$^3$, or both.

Because of the aforedescribed desirable properties, aerogels described herein may be used in applications including catalysis, sensing, energy storage, solar cells, fuel cells, thermal insulation, ultra light structural media, and many other applications. For example, the aerogel may be a part of an electronic component (of an electronic device). In some embodiments, the electronic component may be a capacitor, including a super-capacitor.

NON-LIMITING WORKING EXAMPLE

Example 1

Materials and Methods

A suspension of nanowires/nanotubes (Ag, Si, $MnO_2$, $TiO_2$, single walled carbon nanotubes (SWNTs)) was initially uniformly dispersed with/without surfactant in ethanol using ultra-sonication at a low concentration and evaporated at 313 K so that the suspension was transformed into a more concentrated state with a large compressional volume change.

Ag and Si nanowires were purchased from Blue Nano and Aldrich, respectively. $MnO_2$ and $TiO_2$ nanowires were synthesized by a hydrothermal synthesis method. In this study, $MnO_2$ and $TiO_2$ precursors were dissolved in water and transferred to stainless steel vessels and then heated under high temperature and pressure.

In the case of $MnO_2$ nanowires, the starting materials contained 19.1 mmol of potassium sulphate ($K_2SO_4$), potassium persulphate ($K_2S_2O_8$), and manganese sulphate monohydrate ($MnSO_4 \cdot H_2O$) in a ratio of 1:2:1 in 80 ml de-ionized ("DI") water. The suspension was transferred to a Teflon vessel and the sealed vessel was heated in an oven at 523 K for 1 to 4 days. For the $TiO_2$ nanowires, commercially available P25 (i.e., commercial anatase $TiO_2$ powder) was dissolved in 10 M NaOH solution and the concentration of P25 was 7.5 mgmL$^{-1}$. The mixture was stirred for 30 minutes and transferred to a Teflon vessel held in a stainless steel vessel. The sealed vessel was placed in an oven and heated at 523 K for 4 days.

Purified HIPCO Single-Wall Carbon Nanotubes (SWNT) was obtained from Unidym, Inc. and $MoS_2$, graphite, and h-BN powers were obtained from Aldrich. Linear sodium dodecylbenzene sulfonate (SDBS) and planar sodium cholate (SC) were used as surfactants for dispersion of 1-D and 2-D materials, respectively.

Formations of 1-D Nanowires, Nanotubes, and Nanosheets Gels

Ag and Si nanowires were respectively dispersed in ethanol without or with SDBS for 10~60 min by a Branson 2510 sonicator. The synthesized MnO2 nanowires were suspended in 800 mL of water and stirred overnight to yield a homogeneous suspension. The suspension was filtered and washed several times until all soluble impurities were removed from the solid. The nanowires were dried in a vacuum oven at 353 K for 24 hours. The $MnO_2$ nanowires were sonicated in ethanol with SDBS for 2 hours. The concentrations of Ag, Si, and $MnO_2$ nanowires were 10, 3, and 2 mgmL$^{-1}$, respectively. The surfactant/nanowires weight ratios were all 5:1. The Ag, Si, and $MnO_2$ nanowires suspensions were evaporated at 313 K to transform into more concentrated suspensions (gels) with a large compressional volume change.

The resultant gels were set into cylinder shape molds for several hours and the molded gels were transferred to DI Water. The solutions were heated up to 353 K to remove surfactant and changed at least 4 to 5 times over several days. This step removed surfactant almost completely, as shown SEM images (FIG. 4(a), FIG. 4(b), and FIG. 10).

In addition, $MnO_2$ and $TiO_2$ nanowire network gels were formed right after hydrothermal synthesis. The nanowires gels were washed with excess DI water overnight without stirring or filtering to retain the gel networks.

The suspension of 0.1 wt % SWNTs were dispersed in DI water with SDBS at a SWNT:SDBS ratio of 1:5 for 5-15 hours by a Branson 2510 sonicator. The $MoS_2$, graphite, and h-BN powders were sonicated in 2 wt % SC solution for 4-15 hours. The concentrations of $MoS_2$, graphite, and h-BN powers were 66, 85, and 66 mgmL$^{-1}$, respectively, because the excess initial amount can be higher exfoliated concentration. The SWNT suspension was centrifuged to separate bundles from dispersed SWNTs at 11 k rpm for 1 hour. The exfoliated $MoS_2$, graphene, and h-BN sheets were centrifuged (Eppendorf centrifuge 5804 R) at 1500 rpm for 1 hour to remove the flakes. The supernatant were collected after centrifugation and measured with UV-Vis-NIR spectrophotometer. The concentration of SWNT, $MoS_2$, graphene, and h-BN suspensions were calculated using an absorption coefficient ($\alpha$) of 2600, 1517, and 2460 absorbance mLmg$^{-1}$ m$^{-1}$ at a wavelength of 930, 672, and 660 nm, respectively. The dilute suspensions of SWNT, $MoS_2$, graphene, and h-BN were transformed into gels by evaporating at low temperature. The resultant gels were set into cylinder or rectangular shaped molds and the molded gels were soaked and washed in DI water solvent for several days until surfactant was removed.

The resultant gel was set into various shapes of molds and the molded gels were soaked in water baths. The water baths were heated up to 353 K and changed at least 3-4 times for several days to remove the surfactants. As shown in FIG. 2(b), the gel transition from the more concentrated suspension of nanowires was confirmed. The more concentrated suspensions form gels as indicated by the upside-down bottles. The shape of gels could be readily manipulated by different molds so that aerogels have the various shapes of gels. FIG. 2(c) shows photographs of the gels and aerogels and the formation processes of 2-D materials; illustrated here are $MoS_2$, graphene, and h-BN gel/aerogels.

Formations of 1-D Nanowires, Nanotubes, and Nanosheets Aerogels

Figure 10:
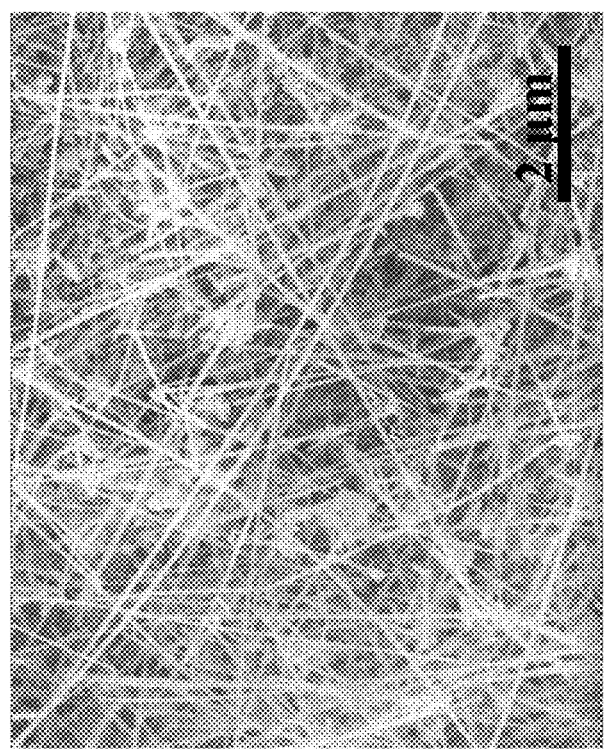
FIG. 10 provides an SEM image of Si nanowires in one embodiment.
Figure 12:
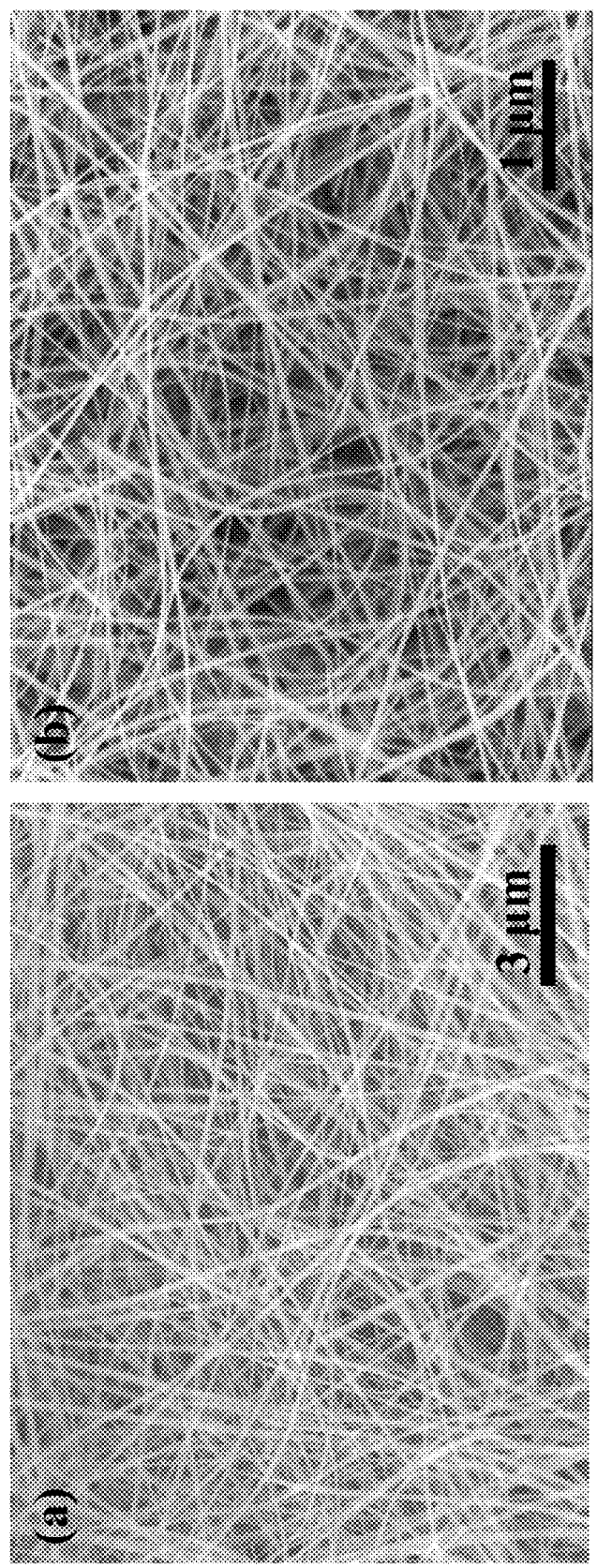
FIGS. 12(a)-12(b) provide low-magnification SEM images of (a) TiO$_2$ and (b) MnO$_2$ nanowire networks obtained directly from in-situ gels by hydrothermal synthesis in one embodiment.

The Ag, Si, and $MnO_2$, nanowires gels were dried using a critical point drier (CPD, 13200J-AB, SPI supplies) into the Ag, Si, and $MnO_2$, nanowires aerogels, with the gel network intact (FIG. 4(a), FIG. 10, and FIG. 4(b)). The $MnO_2$ and $TiO_2$ nanowires gels obtained directly from hydrothermal synthesis were cut by using a blade into various shapes and placed into anhydrous ethanol overnight for solvent exchange. Subsequently, the $MnO_2$ and $TiO_2$ nanowires aerogels were produced by CPD (FIG. 12). The SWNT, $MoS_2$, graphene, and h-BN gels were also transferred into anhydrous ethanol and then they were supercritically dried into the SWNT, $MoS_2$, graphene, and h-BN aerogels (FIG. 12(a), FIG. 4(c), and FIG. 12(b)).

Characterization

Cary 6000i UV-Vis-NIR spectrophotometer was performed to determine the concentration of the supernatant suspensions collected after centrifugation. The concentrations of SWNT, $MoS_2$, and graphene were calculated using an absorption coefficient (a) of 2600, 1517, and 2460 absorbance $mLmg^{-1}$ $m^{-1}$ at a wavelength of 930, 672, and 660 nm, respectively.

AFM measurements were carried out to confirm the diameter distribution of nanowires with Dimension 3100, Veeco. Scanning electron microscopy (JEOL 6700F) was used to confirm length distribution of nanowires and the porosities of the aerogel networks. Nitrogen adsorption and desorption isotherms for porosities of the aerogels were measured at 77 K on a Micromeritics ASAP 2010 system. The results are provided in FIGS. 14(a)-14(d).

Before measurement, the samples were degassed at 423 K under vacuum ($<10^{-4}$ mbar) for several hours. Surface areas of the aerogels were computed with Brunauer-Ennett-Teller (BET) method multimolecular layer adsorption model. The electrical conductivities of Ag nanowire, SWNT, and graphene aerogels at room temperature were measured using micromanipulator electrical four-probe station. The distance was 1.5 mm and depth of probe was about 40 um. The resulting errors in electrical conductivity are estimated to be less than 5%.

Results

Figure 9A:
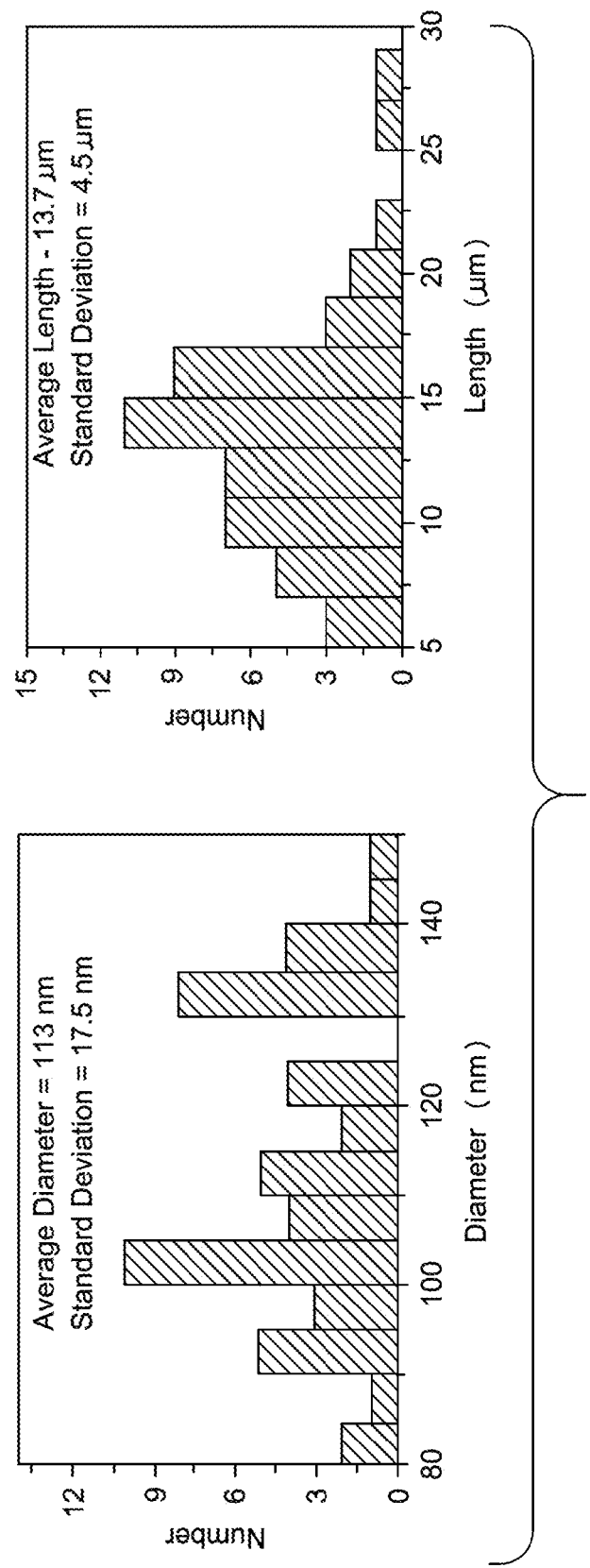
FIG. 9(a)-9(c) provide histograms illustrating the diameter and length distributions for (a) Ag, (b) Si, and (c) MnO$_2$ nanowires in the nanowire suspensions provided in one embodiment. The diameter and length of the nanowires were measured by AFM and SEM, respectively; the average and the standard deviation values are given in the graphs.
Figure 9B:
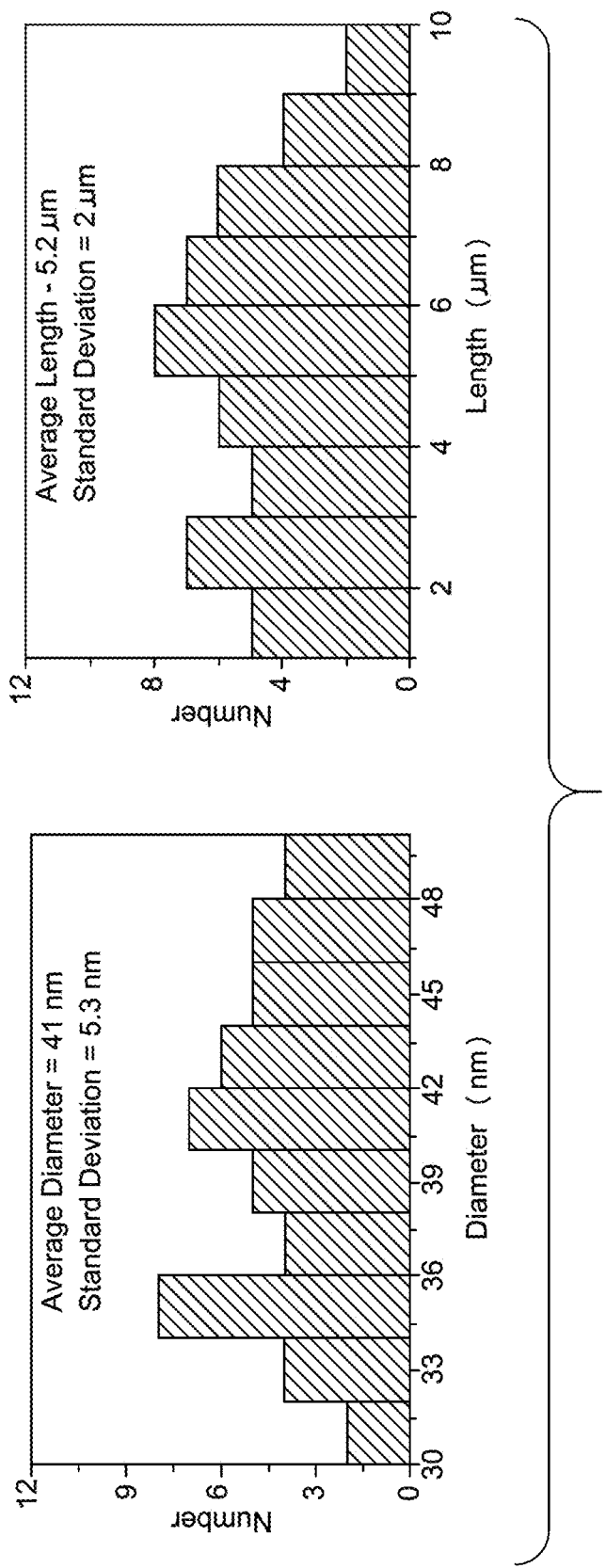
Figure 9C:
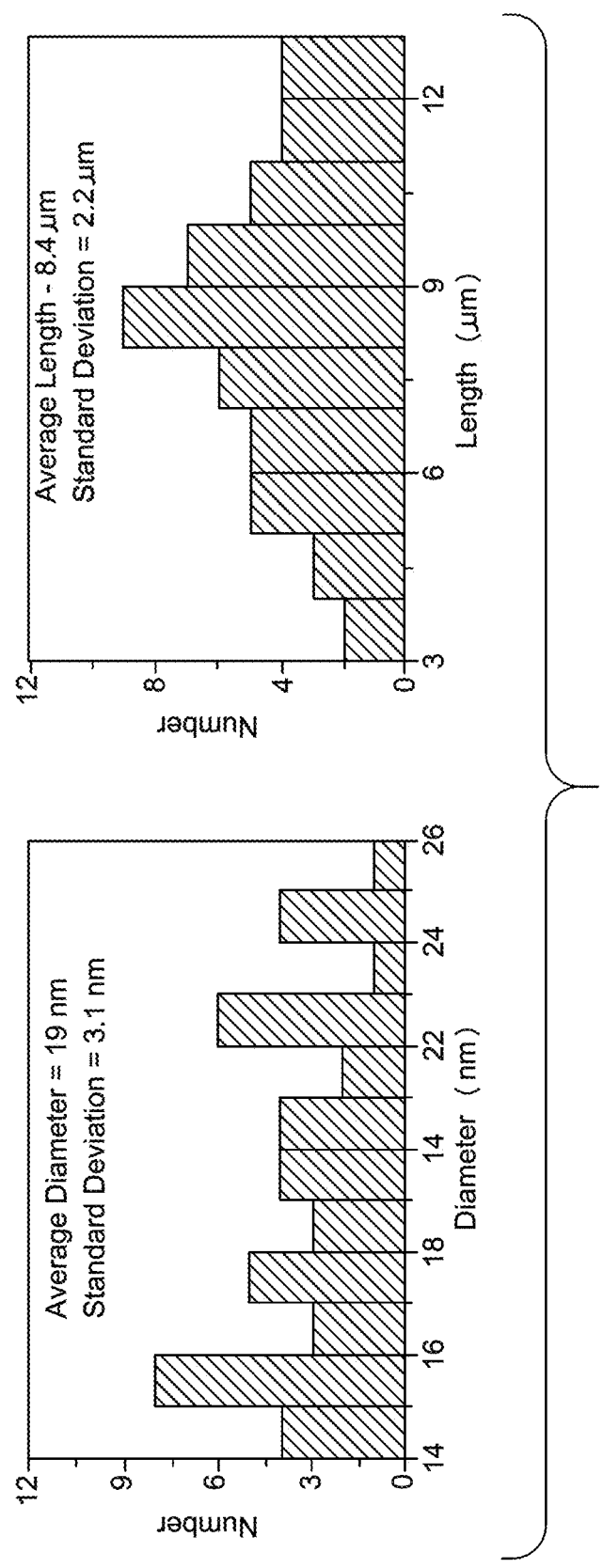

It was found that the theoretical gel transition concentration ($\phi_{gel}$) based upon the Doi and Edwards theory is consistent with the experimental observation reported in this experiment. The aspect ratio of Ag, Si, and $MnO_2$ nanowires were obtained as 121, 127, and 442, respectively, from their average diameter and length (measured with atomic force microscope (AFM), scanning electron microscope (SEM, Table 1, and FIG. 9). Thus, the theoretical gel transition concentration $\phi_{gel}$ of Ag, Si, and $MnO_2$ nanowires should be 0.0083, 0.0079, and 0.0023, respectively. The experimental gel transition concentrations ($\phi_{gel}'$) of Ag, Si, and $MnO_2$ nanowires were found to be 0.0092, 0.0065, and 0.0016, respectively. As a result, it was confirmed that the $\phi_{gel}'$ were very close to the $\phi_{gel}$ and indeed the gels form near the $\phi_{gel}$.

TABLE 1

Average diameter ($d_m$), length ($L_m$), aspect ratio ($a_r$), theoretical gel transition concentration ($\phi_{gel}$), experimental gel transition concentration ($\phi'_{gel}$) of Ag, Si, and $MnO_2$ nanowires.

| NWs | $d_m$ (nm) | $L_m$ (µm) | $a_r$ | $\phi_{gel}$ | $\phi'_{gel}$ |
|---|---|---|---|---|---|
| Ag | 113 | 13.7 | 121 | 0.0083 | 0.0092 |
| Si | 41 | 5.2 | 127 | 0.0079 | 0.0065 |
| $MnO_2$ | 19 | 8.4 | 442 | 0.0023 | 0.0016 |

Figure 11:
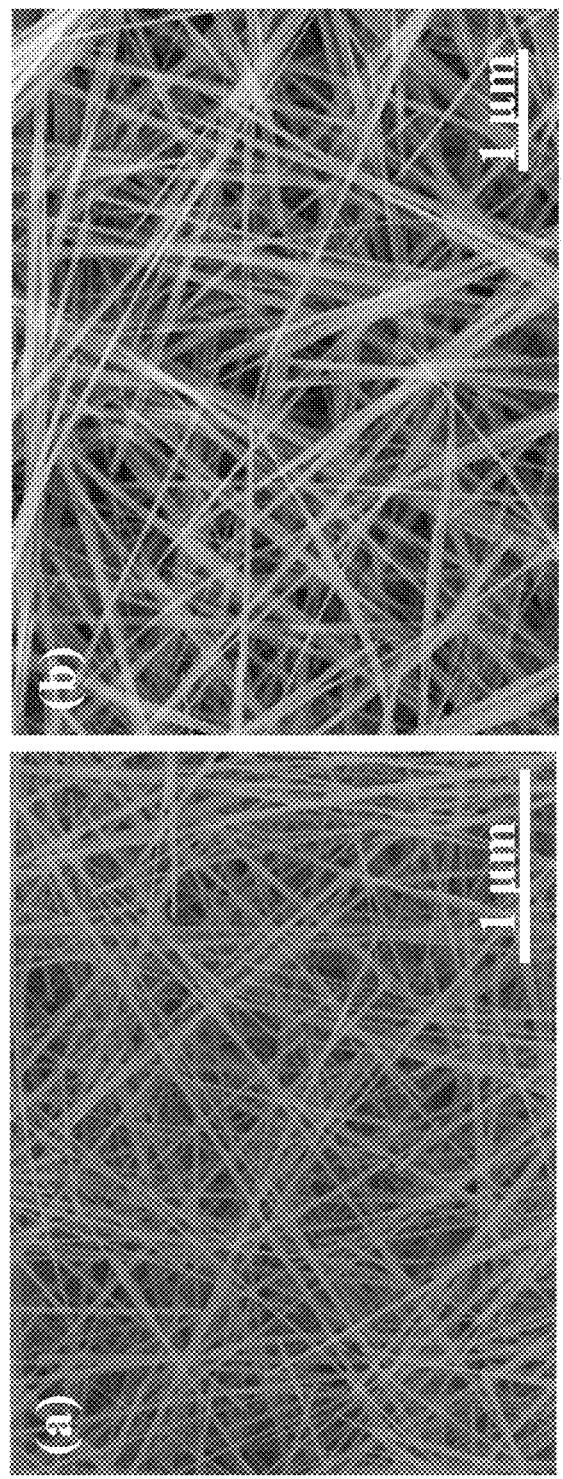
FIGS. 11(a)-11(b) show SEM images of (a) ultrafine MnO$_2$ and (b) bundled MnO$_2$ nanowire networks in one embodiment.

The gels were supercritically dried to the aerogels using CPD, and FIGS. 4(a) and (b), and FIG. 10 are SEM images of the Ag, MnO, and Si nanowires aerogels, respectively, showing the 3-D networks and the overlapping contact points at the nanowire-nanowire junction. These images indicate ultrafine and highly porous nanowire networks with pore sizes in the range of a few hundred nanometers to a few micrometers. Also, the nanowire network was found to be an unbundled network, the formation of which was attributed to the homogenous dispersion of the nanowires suspensions. In the case of Si and $MnO_2$ nanowires, because the diameters thereof are relatively small, they were dispersed at low concentrations with surfactant to impede the strong van der Waals attraction between small diameter nanowires. FIGS. 11(a)-11(b) show SEM images of (a) ultrafine $MnO_2$ and (b) bundled $MnO_2$ nanowire network in one embodiment; the $MnO_2$ nanowires were dispersed (a) with or (b) without surfactant and the $MnO_2$ gels formed at 0.9 wt % (a) and 3.5 wt % (b) at the same aspect ratio. On the other hand, the larger diameter Ag nanowires were dispersed without surfactant due to relatively low surface energy. The uniformly dispersed dilute nanowire suspensions were also slowly compressed up to gel transition concentration by evaporating at low temperature (313 K) to avoid nanowires aggregation.

Because the $TiO_2$ and $MnO_2$ nanowires used in this work were synthesized by a hydrothermal method, the gel formation may directly occur during the hydrothermal synthesis when the nanowires are crystallizing out from the hot water under high pressure. By fixing the reaction conditions but adjusting the reaction time, nanowire gels of different densities (and porosities) were obtained. See FIGS. 12(a)-12(b). As shown in the figures, the highly porous and ultrafine nanowires networks have pore sizes in the range of a few hundred nanometers to a few micrometers.

Figure 6:
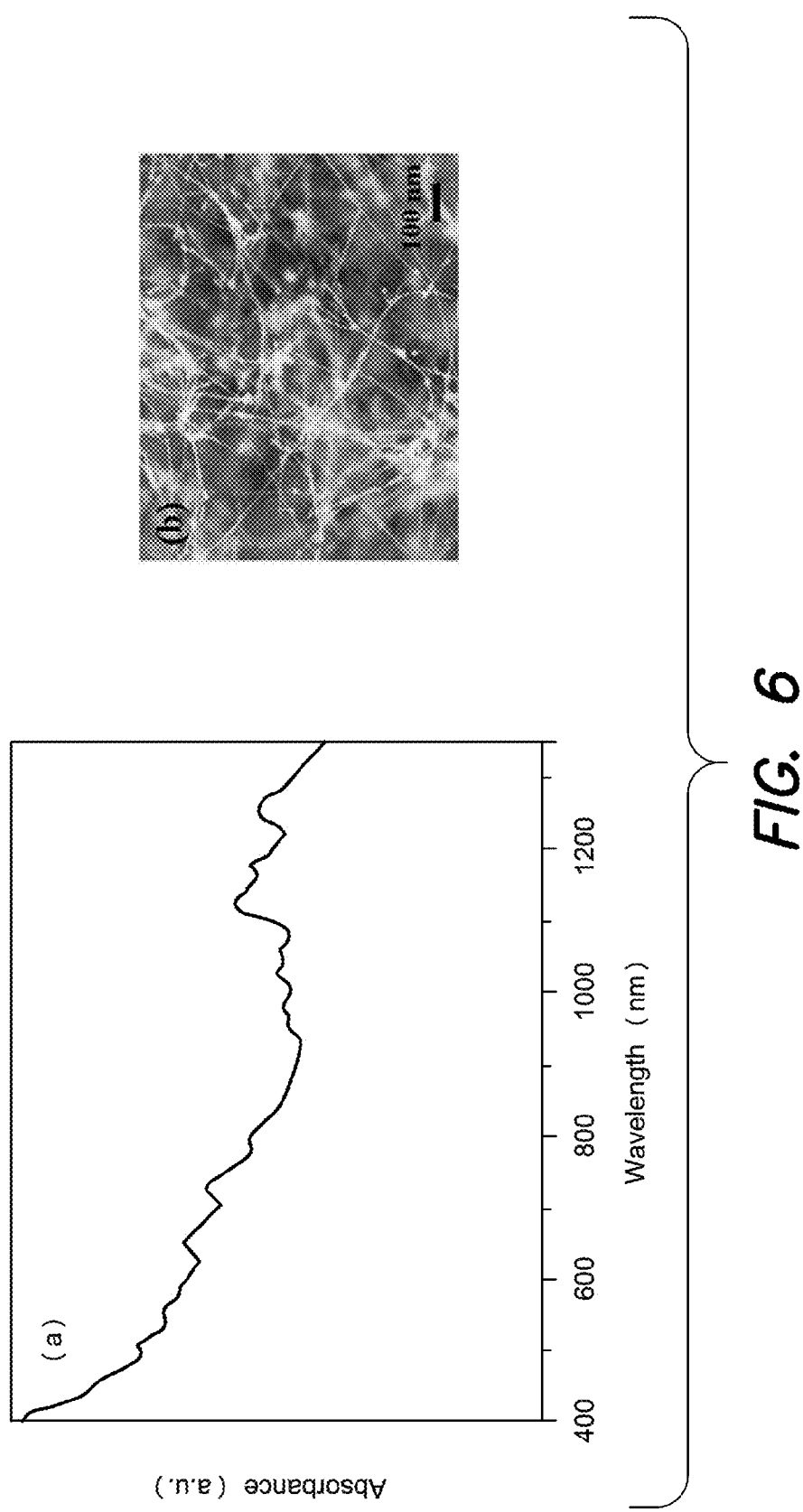
FIGS. 6(a) and (b) provide results of characterizing CNT networks via various techniques in one embodiment: (a) UV-Vis-NIR optical absorption spectroscopy of CNT suspension, and (b) FE-SEM image.
Figure 7:
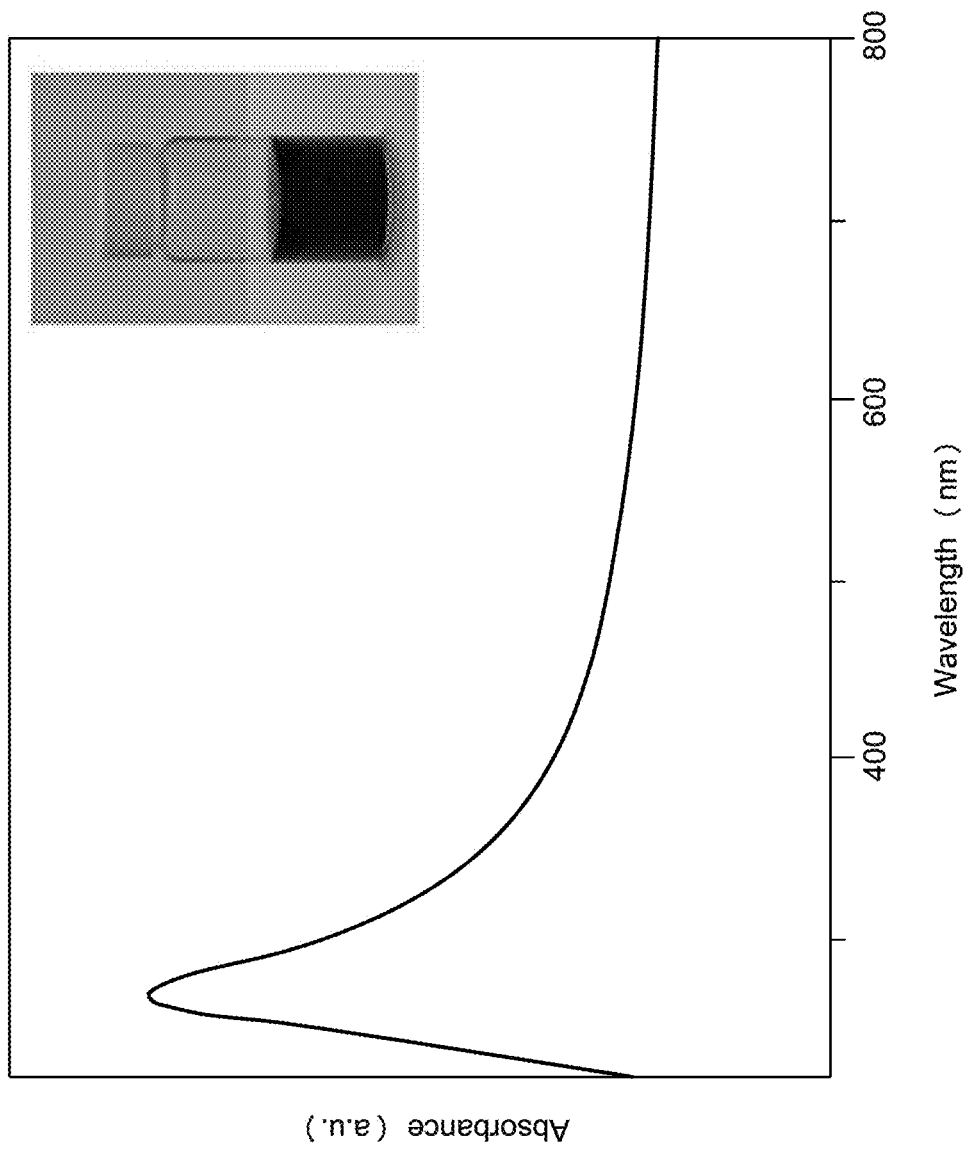
FIG. 7 shows results of UV-Vis-NIR spectroscopy of the graphene suspension exfoliated from graphite with surfactant in water, according to one embodiment.

As shown in FIGS. 6 and 7, aerogels of CNTs and graphene were successfully produced. FIGS. 6(a)-6(b) provide results of characterizing CNT networks via various techniques: (a) UV-Vis-NIR optical absorption spectroscopy of CNT suspension, (b) FE-SEM image. On the other hand, FIG. 7 shows results of UV-Vis-NIR spectroscopy of the graphene suspension exfoliated from graphite with surfactant in water.

For the aerogels made with 2-D nanosheets, dilute suspensions of the exfoliated 2-D sheets were prepared by ultrasonication of $MoS_2$, graphite, and h-BN powers mixed with surfactant in water, followed by centrifugation to remove the thick flakes from the exfoliated sheets. Afterwards, the dilute suspensions were concentrated and transformed into the gels of 2-D sheets at 3.2, 1, and 2.1 wt % for $MoS_2$, graphene, and h-BN nanosheets, respectively (see description above). The gels were supercritically dried into 2-D nanosheet aerogels. They showed porous 3-D network of randomly oriented sheet-like structures (FIG. 4(c) and FIG. 13).

Figure 5:
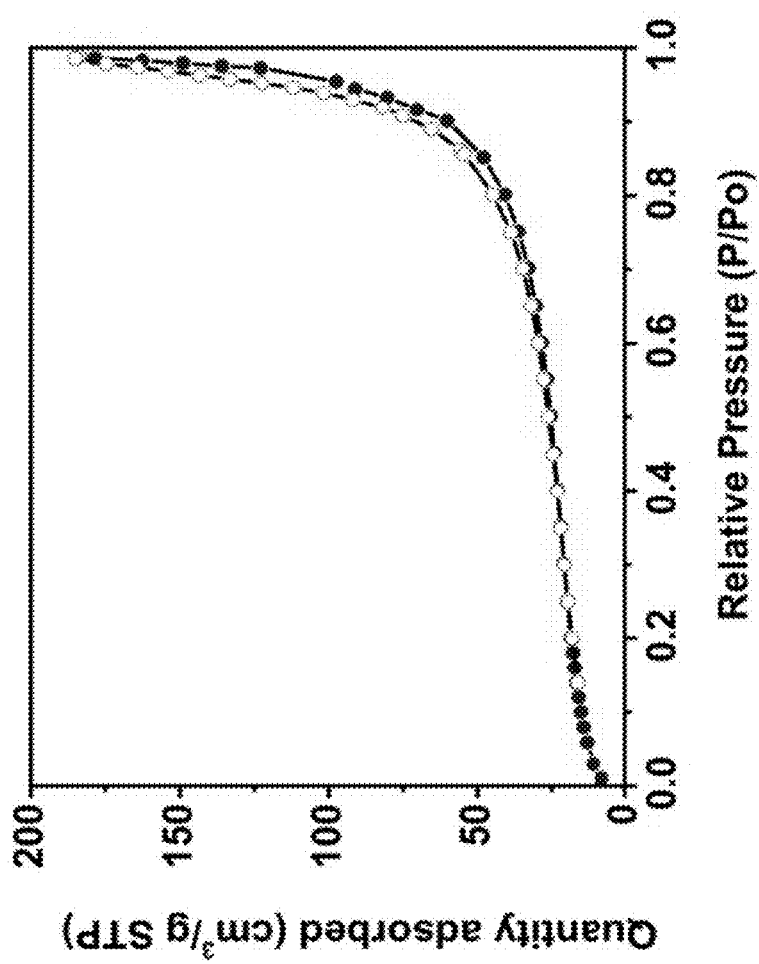
FIG. 5 shows a nitrogen adsorption-desorption isotherm of Si nanowire aerogel at 77 K in one embodiment (solid circle, adsorption data; open circle, desorption data).
Figure 14:
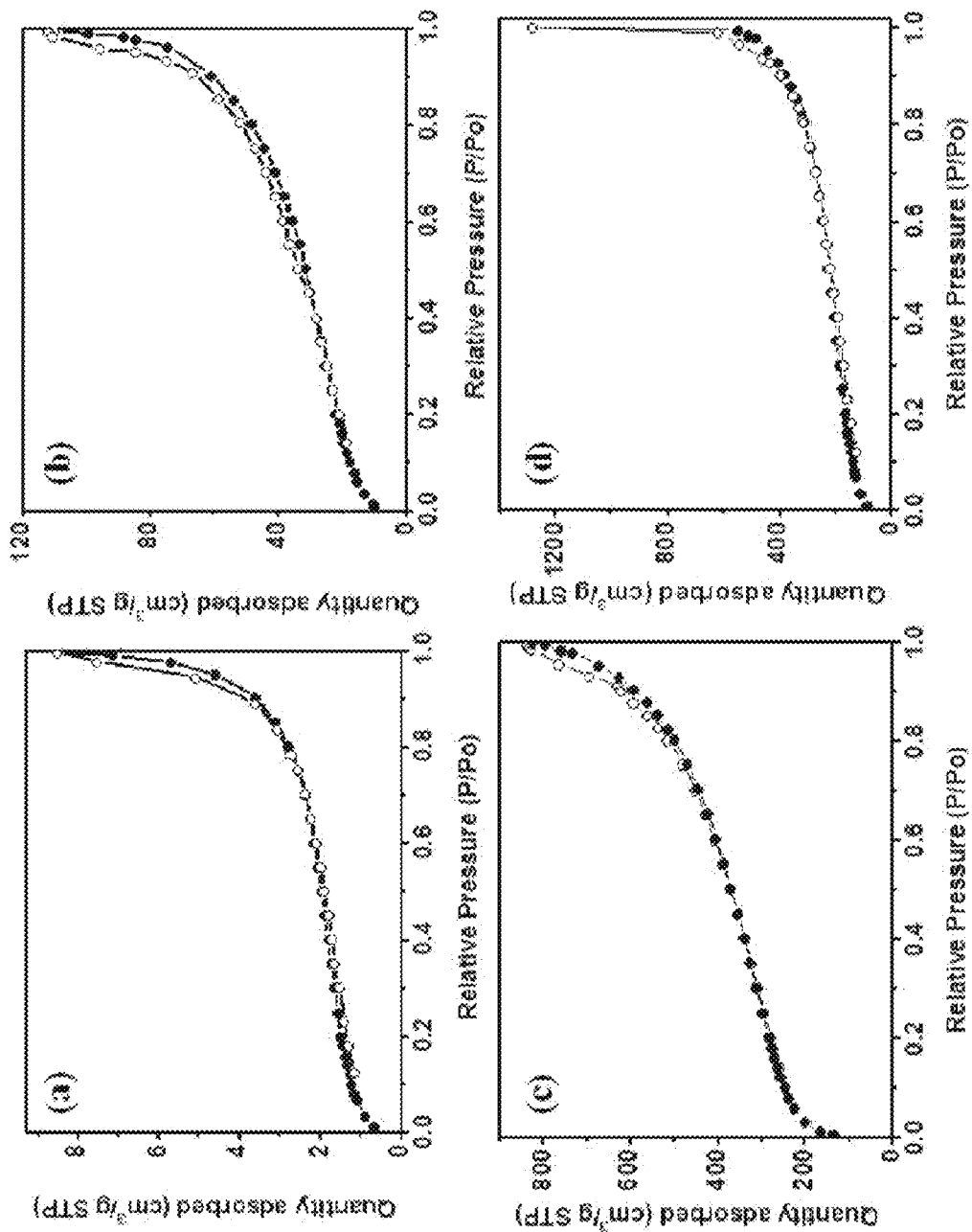
FIGS. 14(a)-14(d) show nitrogen adsorption-desorption isotherm of (a) Ag, (b) MnO$_2$, (c) CNT, and (d) graphene nanowires aerogel at 77 K in one embodiment (solid circle, adsorption data; open circle, desorption data).

The porosities of the nanowires, nanotubes, and nanosheet aerogels were characterized by $N_2$ adsorption-desorption analysis (see FIG. 5 and FIG. 14). FIG. 5 shows the result of Si nanowire aerogel as an example. All the aerogels exhibited a type IV isotherm with an H3-type hysteresis loop, characteristic of an interconnected mesoporous system. This indicates that the mesopores have cylindrical and slit-shaped geometries. Surface areas for Ag, $MnO_2$, $TiO_2$, SWNT, and graphene aerogels were computed with Brunauer-Ennett-Teller (BET) multimolecular layer adsorption model (Table 2).

The ultra-fine porous nanowire networks result in high surface areas. The $MnO_2$ nanowire aerogel has a surface area of 82.2 $m^2g^{-1}$, which is larger than the surface area of self-assembled $MnO_2$ nanowire membrane with the same starting $MnO_2$ nanowire material. The surface area of $TiO_2$ nanowire aerogel is 20.3 $m^2g^{-1}$, which is close to theoretical calculated specific surface area (21.5 $m^2g^{-1}$) of nanowires with a diameter size of 50 nm. The surface area value of 1011 $m^2g^{-1}$ for SWNT aerogel is also close to theoretical calculated specific surface area (1315 $m^2g^{-1}$ of SWNT. The aerogels also have low densities as shown in Table 2. The Ag nanowires aerogel density is 88 $mg/cm^3$, which is relatively high due to the larger diameter (an average diameter is 113 nm), but SWNT aerogel has very low density of 2.7 $mg/cm^3$, lower than those of previously reported SWNT or multiwalled nanotubes (MWNT) aerogels.

TABLE 2

BET surface areas and densities for Ag, Si, MnO$_2$, TiO$_2$, SWNT, and graphene aerogels. TiO$_2$ nanowires aerogel was produced by supercritical drying of gel obtained directly from hydrothermal synthesis.

| Aerogel | Surface area* (m$^2$/g) | Density (mg/cm$^3$) |
| --- | --- | --- |
| Ag | 5.5 | 88 |
| Si | 69.4 | 24.6 |
| MnO$_2$ | 82.2 | 12 |
| TiO$_2$ | 20.3 | 27.8 |
| SWNT | 1011 | 2.7 |
| Graphene | 605 | 13 |

*All the surface area values were obtained with a correlation coefficient of 0.9999.

As can be seen from the SEM images of the aerogels, the branches of the 3-D networks contain high crystalline nanowires or nanosheet material, which is in stark contrast to aerogels produced by conventional methods that have interlinking nanocrystallites (FIG. 1(a) vs. FIGS. 1(b)-1(c)). As a result, the aerogels produced herein have good electrical conductivities. The electrical conductivities of Ag nanowires aerogel is 3×10$^6$ S/m, higher than the value reported for Ag nanowires film. For SWNT aerogels, it was obtained 302 S/m for gel density at 20 mg/cm$^3$, and for graphene aerogels, electrical conductivity of 390 S/m was obtained for a gel density of 24 mg/cm$^3$—these values are higher than previously reported.

It is noted that the properties of the aerogel materials developed in this work depend on the starting nanowires/nanotubes/nanosheets materials. If the starting nanowires have long lengths and small diameters, then large surface area, low density, and/or high electrical conductivity may be obtained. Similarly, the dispersion state of the nanowire/nanotube/nanosheet suspensions also influences the aerogel properties. A uniform suspension of individual nanowires/nanotubes/nanosheets may ensure good aerogel properties; on the other hand, bundling and aggregation may reduce the surface area and increase the density.

Example 2

Summary

Porous inorganic nanowire aerogels with particular properties have various applications. However, creating inorganic nanowire aerogels has remained a challenge. Presented here is a methodology to enable ultralight and highly porous inorganic nanowire aerogels production from in-situ nanowire gels including interconnected inorganic nanowires obtained by hydrothermal synthesis without supporting materials. The in-situ hydrogel formation is based on the self-assembly of (1-D) nanowires into a cross-linking network during growth of nanowires from the precursor suspension at high aspect ratio. The resultant nanowire aerogels exhibit high porosity, high surface areas, low densities, strong mechanical properties, and/or the abilities to act as sorbent scaffolds able to efficiently remove oil/solvent, which is tens of times higher than that of conventional absorbers. This work suggests that the inorganic nanowire aerogels have a widespread potential for applications in industry as well as for topics regarding environment, energy, and thermoelectric devices research.

Results and Discussion

One concept of the methodology described herein depends on the hydrothermal synthesis that grows nanotube/nanowires from high temperature aqueous solutions at high vapor pressures. In fact, this method has been mainly used to produce 1-D nanostructures by manipulating the nanowire morphology and crystallinity, but only very few reports deal with nanowire membrane or block with every low porosities.

The conventional fabrication technique was modified in this Example to assemble nanowire into highly porous interconnected nanowire network via controlling the hydrothermal synthesis condition—e.g., the initial concentration and reaction time. The methodology for inorganic nanowire aerogel production in this example included three steps (i) the preparation of a well-dispersed precursor suspension, (ii) in-situ nanowire gel formation via hydrothermal synthesis, and (iii) the supercritical drying of the gel to form an aerogel.

First of all, because the formation of uniform and monodisperse nanostructures generally demands precise control over nucleation and growth processes, the uniform MnO$_2$ precursor suspension (MnSO$_4$ and K$_2$S$_2$O$_8$) in this Example was initially prepared by ultra-sonication at room temperature and filtered with 0.8 μm size of syringe filter to remove undissolved precipitates due to the low solubility of potassium persulfate. Subsequently, the suspension was transferred to a Teflon vessel, and the sealed vessel was heated in an oven at 525 K for 10 min to 96 h of reaction time. At the beginning of the reaction, MnO$_2$ nanoparticles formed by oxidation of manganese sulfate with an excess amount of potassium persulfate, and MnO$_2$ nucleation developed from initial nanoparticle colloids, and subsequently MnO$_2$ nanowires started to grow at the expense of the colloids and continuously grow until all the colloids was consumed. As a result, the MnO$_2$ nanowires were self-assembled into an interconnected nanowire 3-D network and the nanowire gel form after the reaction time of 30 min. The in-situ nanowire gel networks formed at different reaction times were washed with excess DI water several times and then cut into various shapes with a blade. Subsequently, the resultant gels were supercritical dried into aerogels to retain the original gel volume.

Figure 15:
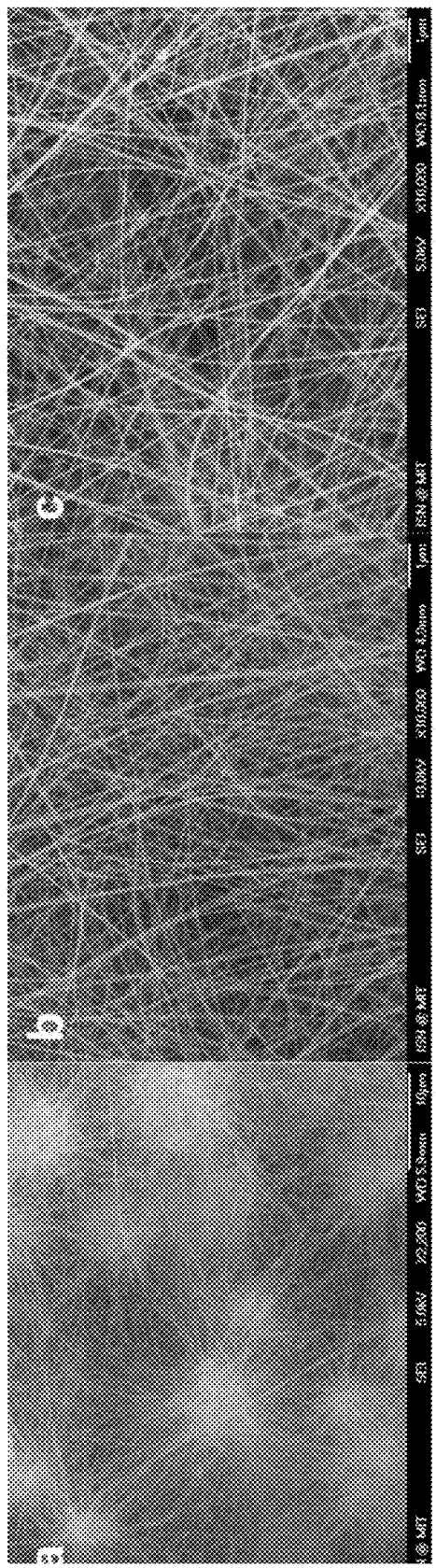
FIGS. 15(a)-15(c) provide SEM images of the 3-D network structures in one embodiment of respectively (a) MnO$_2$ nanowire network at reaction time of 5 h (the insets show a higher magnification of the chestnut-like nanowire network); (b) MnO$_2$ nanowire network at reaction time of 45 h; and (c) MnO$_2$ nanowire network from twofold diluted initial suspension at reaction time of 45 h.

Referring to FIGS. 15(a)-15(c), the 3-D network structure of MnO$_2$ nanowires was illustrated in one embodiment. As shown in FIGS. 15(a) and 15(b), the SEM images of the MnO$_2$ nanowire aerogels from in-situ gels obtained after a reaction time of 5 h and 45 h, respectively, show highly porous and ultrafine nanowire network with pore sizes in the range of a few hundred nanometers to a few micrometers without aggregation over the whole range of the aerogels, as compared to the aerogel network obtained from nonuniform and concentrated precursor suspension without sonication and filtering that shows nonuniformly aggregated network. Not to be bound by any theory, but the aerogel from the shorter time showed chestnut bur like nanowire network, and as time passed, the nanowire network was cross-aligned via rearrangement under tensile stress between nanowires. Both of these aerogels have the same densities of 10 mg/cm$^3$.

After the in-situ nanowire gel formed at the expense of all MnO$_2$ colloids, the densities of nanowire aerogels from the gels formed at different reaction times were found to be constant under the same concentration and volume of the initial precursor suspension, and the same reaction temperature and pressure. However, at very long reaction times over 96 h, the aerogel exhibited lower porosity and higher density, as compared to the aerogel at 48 h. In fact, the nanowire gel formation concentration was found to be reciprocal to the aspect ratio of nanowire and proportional to the density of aerogel.

Because the in-situ nanowire gel was obtained directly from hydrothermal synthesis without the dispersion of the nanowire gel, ultralong nanowires with the length up to several hundred micrometers were found to remain in the gel network, which resulted in the high aspect ratio. As the result, the in-situ gel could form low concentration and the aerogel from the gel has very low density. In order to obtain lower density aerogel, the concentration of precursor suspension was reduced by two-fold dilutions of the initially dispersed and filtered suspension, and the aerogel produced from a gel synthesized at the reaction time of 48 h. As shown in FIG. 15(c), the resultant aerogel has high porosity and ultralow density of 4 mg/cm$^3$, which is as high as about 12.5 times lower than some of the previously reported MnO$_2$ nanowire aerogels and only 3.3 times higher than a density of air at 1.2 mg/cm$^3$.

Figure 16:
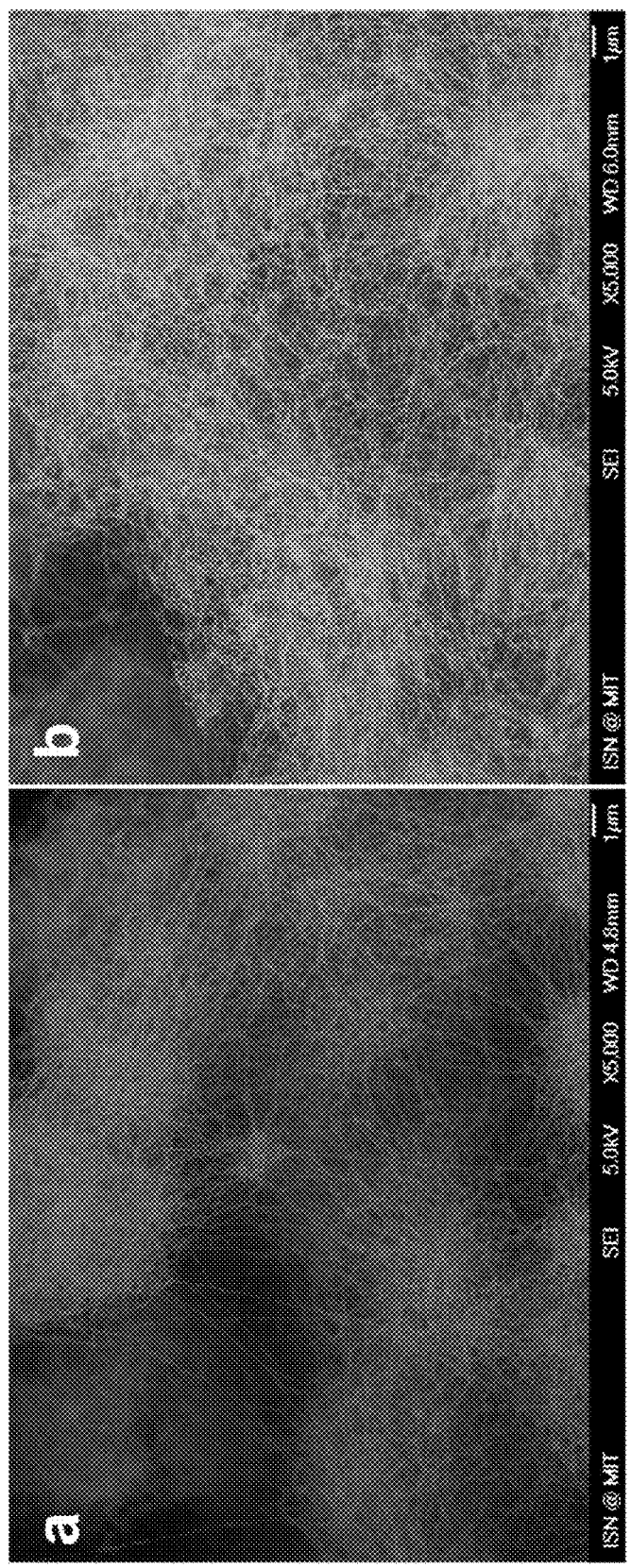
FIGS. 16(a)-16(b) provide SEM images of the 3-D network structures in one embodiment of (a) TiO$_2$ nanowires and (b) TiO$_2$ nanowire networks at reaction time of 4.5 and 9.5 h, respectively.

Also produced in this experiment were highly porous and lightweight TiO$_2$ nanowire aerogels from in-situ TiO$_2$ nanowire gels obtained by hydrothermal method (TiO$_2$ powder and 10 M KOH solution are mixed and heated at 453 K). FIGS. 16(a) and 16(b) show the SEM images of the 3-D network structures of TiO$_2$ nanowires after a reaction time of 4.5 and 9.5 h, respectively. In FIGS. 16(a) and 16(b), the SEM images of TiO$_2$ nanowire aerogels exhibit the chestnut bur like nanowires network and ross-linked ultrafine and ultralong nanowire network at the reaction times of 4.5 and 9.5 h, respectively.

Figure 17:
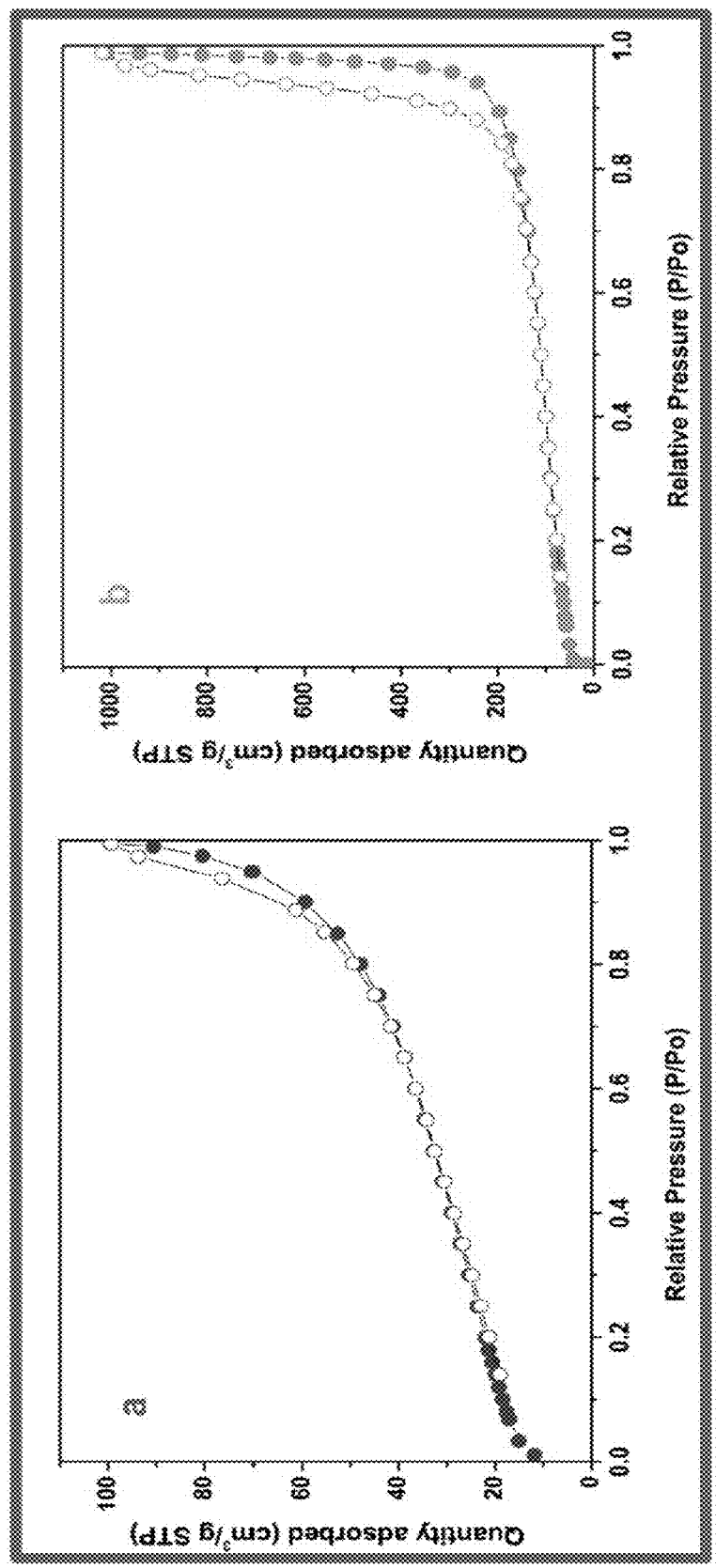
FIGS. 17(a)-17(b) show porosity of MnO$_2$ and TiO$_2$ nanowire aerogel by N$_2$ adsorption-desorption analysis in one embodiment: (a) and (b) respectively show N$_2$ adsorption/desorption isotherms of MnO$_2$ and TiO$_2$ nanowire aerogel at 77 K (solid circle, adsorption data; open circle, desorption data).

The porosities of MnO$_2$ and TiO$_2$ nanowire aerogels were confirmed by N$_2$ adsorption-desorption analysis. FIGS. 17(a) and 17(b) respectively illustrate porosity of MnO$_2$ and TiO$_2$ nanowire aerogel by N$_2$ adsorption-desorption analysis at 77 K (solid circle, adsorption data; open circle, desorption data) in one embodiment. Particularly, FIG. 17 shows the N$_2$ adsorption-desorption isotherm and pore size distribution of MnO$_2$ and TiO$_2$ nanowire aerogels. These aerogels showed a type IV isotherm with an H3-type hysteresis loop, which indicate that mesopores have cylindrical pore geometries (FIGS. 17(a) and 17(b)). Their surface areas were calculated with the Brunauer-Ennett-Teller (BET) method. The ultrafine porous MnO$_2$ and TiO$_2$ nanowire networks resulted in high surface areas of 80 m$^2$g$^{-1}$ and 292 m$^2$g$^{-1}$, respectively, which are 2 times larger than the surface area of both nanowire membranes.

The absorption of MnO$_2$ nanowire aerogels, which has high porosity and large surface area, with respect to oil/solvents was also investigated. The aerogel was first coated using a vapor deposition technique that provided a coating over the entire surface of the porous material to obtain hydrophobic surfaces. The method employed in this Example was based on a modified version of that reported in Yuan, J. et al. *Nat. Nanotechnol.* 2008, 3, 332-336. The nanowire membrane was placed together with a polydimethysiloxane (PDMS) film in a covered glass container and heated at 234° C. for 2 h. Upon heat treatment, volatile silicone molecules in the form of short PDMS chains may form a conformal layer on the metal oxide substrate and subsequently crosslinked, to result in the formation of a silicone coating. As a result, the aerogel became hydrophobic, as shown by its water contact angle of 148° with a 13.3 μL water droplet, and absorbed motor oil and various organic solvents.

Figure 18:
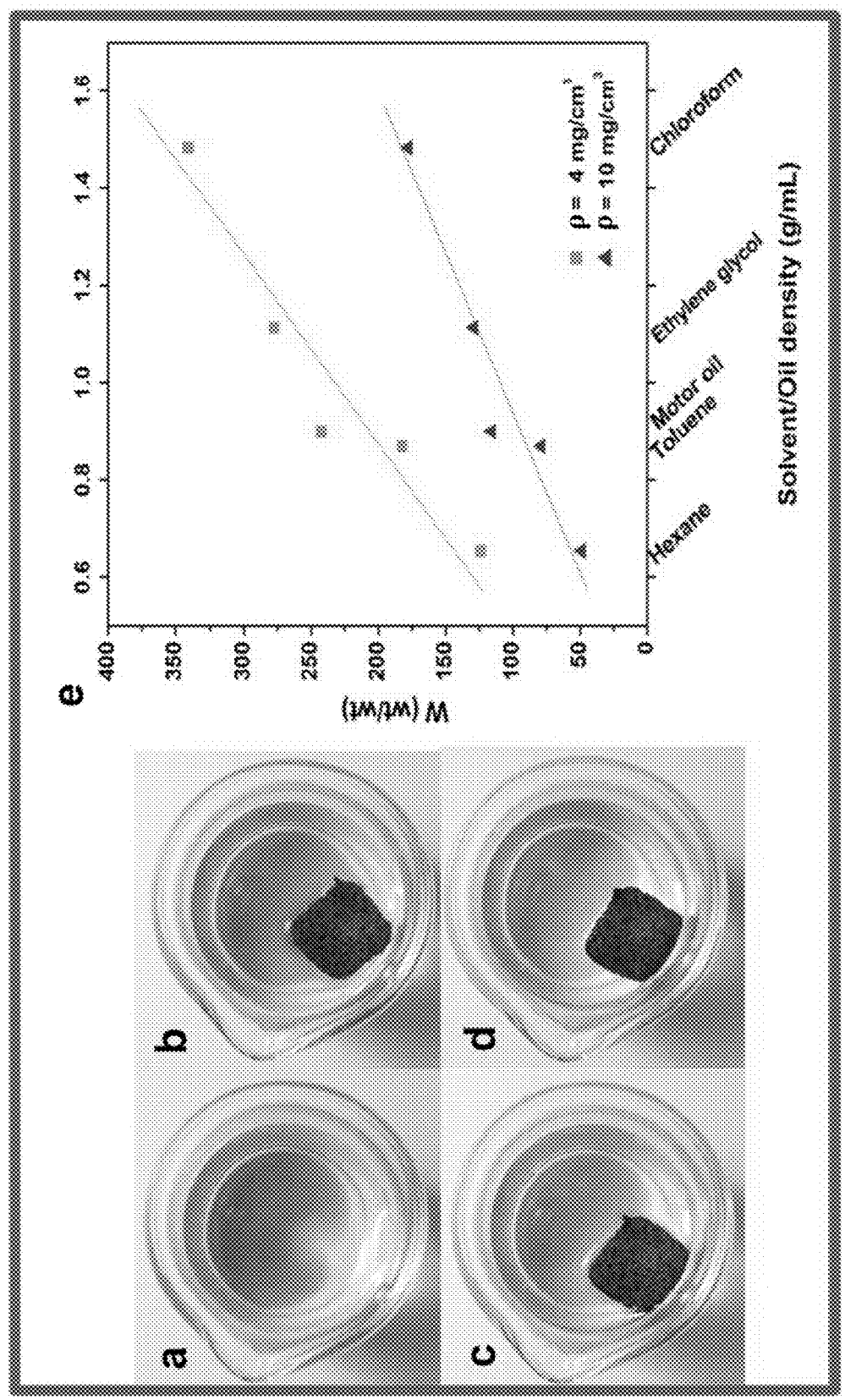
FIGS. 18(a)-(e) show results of motor oil absorption of MnO$_2$ nanowire aerogel and weight-to-weight absorption capacity of the MnO$_2$ nanowire aerogels as oil/solvents absorbents in one embodiment: (a)-(d) show optical images of the aerogel being absorbed (the blue color of stained motor oil floating on DI water) within 41 s, and (e) shows weight-to-weight absorption capacity (defined by W (wt/wt), the ratio of the final weight after absorption to the initial weight before absorption) of the aerogels.

For oil/solvents, weight-to-weight absorption capacity, (defined by W (wt/wt), the ratio of the final weight after absorption to the initial weight before absorption) was measured for the MnO$_2$ nanowire aerogels with two different densities: 4 and 10 mg/cm$^3$, as shown in FIG. 18(e). FIGS. 18(a)-18(e) illustrate the process of motor oil absorption of MnO$_2$ nanowire aerogel and weight-to-weight absorption capacity of the MnO$_2$ nanowire aerogels as oil/solvents absorbents in one embodiment. FIGS. 18(a)-18(d) illustrate the process of motor oil absorption of MnO$_2$ nanowire aerogel, and that the aerogel was absorbed fairly quickly within 41 seconds (see the blue color of stained motor oil floating on DI water). The aerogel with 4 mg/cm$^3$ of density was achieved up to W=250-7.5 times higher than that of conventional absorbents (i.e., Woolspill™ knops with a density as low as 33 mg/cm$^3$, W=36 with heavy fuel oil (d g/cm$^3$)). At a density of 4 mg/cm$^3$, the MnO$_2$ nanowire aerogels are capable of reaching as high as W=350 for chloroform, which is the highest value compared with those of previously reported absorbents. Thus, the highly efficient in-situ synthetic MnO$_2$ nanowire aerogel is a candidate as oil/solvent absorbent for environmental applications.

EXEMPLARY EMBODIMENTS

The exemplary embodiments provided below are based on the claims of the priority provisional Application Ser. Nos. 61/612,736 filed Mar. 19, 2012 and 61/594,832, filed Feb. 3, 2012.

Embodiment 1

A method of making, comprising:
(A) increasing a concentration of a suspension comprising a gel precursor under a condition that promotes formation of a gel, wherein the gel precursor comprises particulates having an asymmetric geometry; and
(B) removing a liquid from the gel to form an aerogel, wherein the aerogel and the gel have substantially the same geometry.

Embodiment 2

The method of embodiment 1, wherein the gel precursor comprises a metal, an oxide, a nitride, a sulfide, a semiconductor, a carbon-containing material, or combinations thereof.

Embodiment 3

The method of embodiment 1, wherein in the gel precursor comprises silver, manganese dioxide, titanium dioxide, silica, alumina, graphite, graphene, silicon, MoS$_2$, CdS, CdSe, PbTe, boron nitride, or combinations thereof.

Embodiment 4

The method of embodiment 1, wherein the particulates comprises single-walled nanotubes, multi-walled nanotubes, nanosheets, or a combination thereof.

Embodiment 5

The method of embodiment 1, wherein the particulates have an aspect ratio of greater than about 50.

Embodiment 6

The method of embodiment 1, wherein the particulates have an aspect ratio of greater than about 400.

Embodiment 7

The method of embodiment 1, wherein the geometry of the particulates is one of tube-like, wire-like, and sheet-like.

Embodiment 8

The method of embodiment 1, wherein the suspension further comprises a surfactant.

Embodiment 9

The method of embodiment 1, wherein (A) further comprises increasing the concentration above a gel network transition point.

Embodiment 10

The method of embodiment 1, wherein (A) further comprises increasing Van der Waals force between molecules of the gel precursor.

Embodiment 11

The method of embodiment 1, wherein (A) further comprises removing a surfactant from the suspension.

Embodiment 12

The method of embodiment 1, wherein the particulates in the gel substantially do not aggregate.

Embodiment 13

The method of embodiment 1, further comprising making the gel precursor by hydrothermal synthesis.

Embodiment 14

The method of embodiment 1, wherein (B) is carried out by at least one of (i) freeze drying and (ii) supercritical point drying.

Embodiment 15

The method of embodiment 1, wherein the aerogel and the gel have substantially the same volume.

Embodiment 16

The method of embodiment 1, wherein the particulates in the aerogel form a three-dimensional network.

Embodiment 17

The method of embodiment 1, wherein the particulates comprise crystalline nanotubes, nanowires, nanosheets, or a combination thereof.

Embodiment 18

The method of embodiment 1, wherein the aerogel has an electrical conductivity of at least 300 S/m.

Embodiment 19

The method of embodiment 1, wherein the aerogel has an electrical conductivity of at least $3 \times 10^6$ S/m.

Embodiment 20

The method of embodiment 1, wherein the aerogel has a surface area of at least 5.5 $m^2$/g.

Embodiment 21

A composition, comprising: an aerogel, comprising particulates having an aspect ratio of at least 50.

Embodiment 22

The composition of embodiment 21, wherein the particulates substantially do not aggregate to one another.

Embodiment 23

The composition of embodiment 21, wherein the particulates comprise a metal, an oxide, a nitride, a sulfide, a semiconductor, a carbon-containing material, or combinations thereof.

Embodiment 24

The composition of embodiment 21, wherein in the gel precursor comprises silver, manganese oxide, silica, alumina, graphite, graphene, silicon, $MoS_2$, CdS, CdSe, PbTe, boron nitride, or combinations thereof.

Embodiment 25

The composition of embodiment 21, wherein the particulates comprises single-walled nanotubes, multi-walled nanotubes, nanosheets, or a combination thereof.

Embodiment 26

The composition of embodiment 21, wherein the particulates have an aspect ratio of greater than about 120.

Embodiment 27

The composition of embodiment 21, wherein the particulates have an aspect ratio of greater than about 400.

Embodiment 28

The composition of embodiment 21, wherein the geometry of the particulates is one of tube-like, wire-like, and sheet-like.

Embodiment 29

The composition of embodiment 21, wherein the particulates comprises silver and the aerogel has (i) an electrical conductivity of at least $3 \times 10^6$ S/m, (ii) a density of less than or equal to about 90 mg/$cm^3$, or both.

Embodiment 30

The composition of embodiment 21, wherein the particulates comprises single-wall carbon nanotubes and the aerogel has (i) an electrical conductivity of at least 300 S/m, (ii) a density of less than or equal to 2.7 mg/$cm^3$, or both.

Embodiment 31

The composition of embodiment 21, wherein the particulates comprises graphene and the aerogel has (i) an electrical conductivity of at least 400 S/m, (ii) a density of less than or equal to 15 mg/$cm^3$, or both.

Embodiment 32

The composition of embodiment 21, wherein the particulates have at least one of the following:

(i) the particulates comprise silver and have an average diameter of about 113 nm and an average length of about 13.7 µm;

(ii) the particulates comprise silicon and have an average diameter of about 41 nm and an average length of about 5.2 µm; and (iii) the particulates comprise manganese oxide and have an average diameter of about 19 nm and an average length of about 8.4 µm.

Embodiment 33

The composition of embodiment 21, wherein the aerogel has an interconnected mesoporous microstructure.

Embodiment 34

The composition of embodiment 21, wherein the aerogel has pores that have a geometry that is cylindrical, slit-shaped, or both.

Embodiment 35

An electronic component, comprising the composition of embodiment 21.

Embodiment 36

A composition, comprising:
an aerogel, comprising particulates having an aspect ratio of at least 50,
wherein the aerogel is made according to a method, comprising:
(A) increasing a concentration of a suspension comprising a gel precursor under a condition that promotes formation of a gel, wherein the gel precursor comprises the particulates; and
(B) removing a liquid from the gel to form the aerogel, wherein the aerogel and the gel have substantially the same geometry.

Embodiment 37

The composition of embodiment 36, wherein the particulates comprise a metal, an oxide, a nitride, or a sulfide Embodiment 38

The composition of embodiment 36, wherein the particulates comprises single-walled nanotubes, multi-walled nanotubes, nanosheets, or a combination thereof.

Embodiment 39

The composition of embodiment 36, wherein the particulates have an aspect ratio of greater than about 400.

Embodiment 40

A capacitor, comprising the composition of embodiment 36.

Embodiment 41

A method of making an aerogel, comprising:
(A) increasing a concentration of suspension comprising a gel precursor under a condition that promotes formation of a gel; and
(B) removing a liquid in the suspension to form the aerogel, wherein the aerogel and the gel have substantially the same shape.

Embodiment 42

The method of embodiment 41, wherein (A) comprises increasing the concentration above a gel network transition point.

Embodiment 43

The method of embodiment 41, wherein (A) comprises increasing Van der Walls force between molecules of the gel precursor.

Embodiment 44

The method of embodiment 41, wherein (B) is carried out by at least one of (i) freeze drying and (ii) supercritical drying.

Embodiment 45

The method of embodiment 41, wherein the precursor comprises at least one of nanotubes and nanowires.

Conclusion

All literature and similar material cited in this application, including, but not limited to, patents, patent applications, articles, books, treatises, and web pages, regardless of the format of such literature and similar materials, are expressly incorporated by reference in their entirety. In the event that one or more of the incorporated literature and similar materials differs from or contradicts this application, including but not limited to defined terms, term usage, described techniques, or the like, this application controls.

While the present teachings have been described in conjunction with various embodiments and examples, it is not intended that the present teachings be limited to such embodiments or examples. On the contrary, the present teachings encompass various alternatives, modifications, and equivalents, as will be appreciated by those of skill in the art.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one." Any ranges cited herein are inclusive.

The terms "substantially" and "about" used throughout this Specification are used to describe and account for small fluctuations. For example, they can refer to less than or equal to ±5%, such as less than or equal to ±2%, such as less than or equal to ±1%, such as less than or equal to ±0.5%, such as less than or equal to ±0.2%, such as less than or equal to ±0.1%, such as less than or equal to ±0.05%.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The claims should not be read as limited to the described order or elements unless stated to that effect. It should be understood that various changes in form and detail may be made by one of ordinary skill in the art without departing from the spirit and scope of the appended claims. All embodiments that come within the spirit and scope of the following claims and equivalents thereto are claimed.

What is claimed:

1. A method of making, comprising:
   (A) increasing a concentration of a suspension comprising a gel precursor under a condition that promotes formation of a gel, wherein the gel precursor comprises particulates having an asymmetric geometry, and the particulates in the formed gel are physically bonded by Van der Waals forces; and
   (B) removing a liquid from the gel to form an aerogel, wherein the aerogel and the gel have substantially the same geometry.

2. The method of claim 1, wherein the gel precursor comprises a metal, an oxide, a nitride, a sulfide, a semiconductor, a carbon-containing material, or combinations thereof.

3. The method of claim 1, wherein the particulates have an aspect ratio of greater than about 50.

4. The method of claim 1, wherein (A) further comprises increasing the concentration above a gel network transition point.

5. The method of claim 1, wherein (A) further comprises removing a surfactant from the suspension.

6. The method of claim 1, wherein the particulates in the gel substantially do not aggregate.

7. The method of claim 1, wherein (A) further comprises forming the gel precursor into the gel by hydrothermal synthesis.

8. The method of claim 1, wherein (B) is carried out by at least one of (i) freeze drying and (ii) supercritical point drying.

9. A method of making, comprising:
   (A) subjecting a suspension comprising a gel precursor comprising particulates to at least one of sonication and filtering;
   (B) forming the suspension into a gel using hydrothermal synthesis; and
   (C) removing a liquid from the gel to form an aerogel, wherein at least some of the particulates have an aspect ratio of at least 50.

10. The method of claim 9, wherein (B) further comprises controlling at least one of an initial concentration of the gel precursor and a reaction time of the hydrothermal synthesis to affect formation of the gel.

11. The method of claim 10, wherein the aerogel and the gel have substantially the same volume.

12. The method of claim 1, wherein the gel precursor consists essentially of the particulates and an optional surfactant.

* * * * *